(12) United States Patent
Liu et al.

(10) Patent No.: US 8,813,127 B2
(45) Date of Patent: Aug. 19, 2014

(54) MEDIA CONTENT RETRIEVAL SYSTEM AND PERSONAL VIRTUAL CHANNEL

(75) Inventors: Min Liu, Redmond, WA (US); Zhen Ma, Kirkland, WA (US); Anthony Vincent Discolo, Sammamish, WA (US); Wei Ning, Redmond, WA (US); Ying Wu, Redmond, WA (US); Rathe Hollingum, Dublin (IE); Renaud Bordelet, Dublin (IE)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/468,289

(22) Filed: May 19, 2009

(65) Prior Publication Data

US 2010/0299701 A1    Nov. 25, 2010

(51) Int. Cl.
*G06F 3/00*    (2006.01)
*G06F 13/00*    (2006.01)
*H04N 5/445*    (2011.01)

(52) U.S. Cl.
USPC ............... 725/38; 725/37; 725/44; 725/46; 725/47; 725/50; 725/51; 725/53; 725/86; 370/466; 348/43; 709/246; 341/50; 382/232

(58) Field of Classification Search
USPC .......... 725/37–38, 44, 46–47, 50, 51, 53, 86; 370/466; 348/43; 709/246; 341/50; 382/232
See application file for complete search history.

(56) References Cited

U.S. PATENT DOCUMENTS

| 6,184,877 B1 | 2/2001 | Dodson et al. |
| 6,772,147 B2 | 8/2004 | Wang |

(Continued)

FOREIGN PATENT DOCUMENTS

| CN | 1859561 | 11/2006 |
| CN | 101404018 | 4/2009 |

(Continued)

OTHER PUBLICATIONS

"Broadcom Extends Chumby(R) Platform to Internet-Connected TVs, Set-Top Boxes and Blu-Ray Disc(R) Players", Smart Brief, Feb. 23, 2009, website, http://www.smartbrief.com/news/aaaa/industryPR-detail.jsp?id=9B38EBD0-36B8-47B1-B5D1-275B4A7364FE.

(Continued)

*Primary Examiner* — Yassin Alata
(74) *Attorney, Agent, or Firm* — Micah Goldsmith; Peter Taylor; Micky Minhas

(57) ABSTRACT

A system is disclosed for media content search and retrieval, and a virtual television channel capable of using that system. The present system may be implemented on a computing device, such as for example a media service server, and a client device, such as for example a set top box for a television system, a mobile telephone, a personal digital assistant or a gaming console. A first aspect of the present system relates to a media download control engine which enables a client device with limited capabilities to play media content which comes from a website in a format not supported by the client device. A second aspect of the present system may make use of the media download control engine to obtain media content and create customized virtual channels. The second aspect in particular relates to a virtual channel engine that schedules a continuous stream of content for the user, which content is selected based on topics of interest to the user.

7 Claims, 14 Drawing Sheets

(56) References Cited

U.S. PATENT DOCUMENTS

| | | | |
|---|---|---|---|
| 6,774,926 | B1 | 8/2004 | Ellis et al. |
| 7,409,437 | B2 | 8/2008 | Ullman et al. |
| 2002/0042923 | A1* | 4/2002 | Asmussen et al. ............. 725/92 |
| 2002/0156833 | A1 | 10/2002 | Maurya et al. |
| 2003/0023756 | A1 | 1/2003 | Awamoto et al. |
| 2003/0028890 | A1 | 2/2003 | Swart |
| 2003/0135860 | A1* | 7/2003 | Dureau ........................... 725/82 |
| 2007/0067267 | A1 | 3/2007 | Ives |
| 2007/0113246 | A1* | 5/2007 | Xiong ............................. 725/39 |
| 2007/0199019 | A1 | 8/2007 | Angiolillo |
| 2007/0244902 | A1 | 10/2007 | Seide |
| 2008/0307463 | A1 | 12/2008 | Beetcher |
| 2009/0019495 | A1 | 1/2009 | Kim |
| 2009/0029687 | A1 | 1/2009 | Ramer et al. |

FOREIGN PATENT DOCUMENTS

| | | |
|---|---|---|
| EP | 1507212 | 2/2005 |
| EP | 1967957 | 7/2013 |
| JP | 2003016001 | 1/2003 |
| JP | 2004046789 | 2/2004 |
| JP | 2007150764 | 6/2007 |
| JP | 2008305029 | 12/2008 |
| WO | 03007184 | 1/2003 |
| WO | 2007074521 | 7/2007 |

OTHER PUBLICATIONS

"Invision.TV Unveils Interactive Program Guide for Internet Video", Sep. 8, 2008, website, http://www.tvover.net/2008/09/08/InvisionTV+Unveils+Interactive+Program+Guide+for+Internet+Video.aspx.
English Abstract for CN1859561 published Nov. 8, 2006.
English Abstract for CN101404018 published Apr. 8, 2009.
Office Action dated Aug. 31, 2012 in Chinese Patent Application No. 201080022567.9.
Response to Office Action filed Dec. 28, 2012 in Chinese Patent Application No. 201080022567.9.
Office Action dated Jun. 27, 2013 in Chinese Patent Application No. 201080022567.9.
Response to Office Action filed Sep. 11, 2013 in Chinese Patent Application No. 201080022567.9.
English language Summary, and Claims as amended in, Response to Office Action filed Sep. 11, 2013 in Chinese Patent Application No. 201080022567.9.
Office Action dated Oct. 30, 2013 in Chinese Patent Application No. 201080022567.9.
English language Summary and Office Action dated Oct. 30, 2013 in Chinese Patent Application No. 201080022567.9.
Response to Office Action filed Nov. 14, 2013 in Chinese Patent Application No. 201080022567.9.
English language Summary of, and Claims as amended in, Response to Office Action filed Nov. 14, 2013 in Chinese Patent Application No. 201080022567.9.
Supplementary European Search Report dated Sep. 30, 2013 in European Patent Application No. EP10778109.8.
Office Action dated Feb. 22, 2013 in Chinese Patent Application No. 201080022567.9.
Response to Office Action filed Apr. 24, 2013 in Chinese Patent Application No. 201080022567.9.
Office Action dated Dec. 9, 2013 in Japanese Patent Application No. 2012-511885.
English language Abstract and Machine Translation for JP2007150764 published Jun. 14, 2007.
English language Abstract and Machine Translation for JP2008305029 published Dec. 18, 2008.
English language Abstract for WO2007074521 published Jul. 5, 2007.
Response to Office Action filed Feb. 18, 2014 in European Patent Application No. 10778109.8.
Office Action dated Apr. 22, 2014 in Japanese Patent Application No. 2012-511885.
English language Patent Abstract of JP2004046789 published Feb. 2, 2004.
English language Patent Abstract of JP2003016001 published Jan. 17, 2003.

* cited by examiner

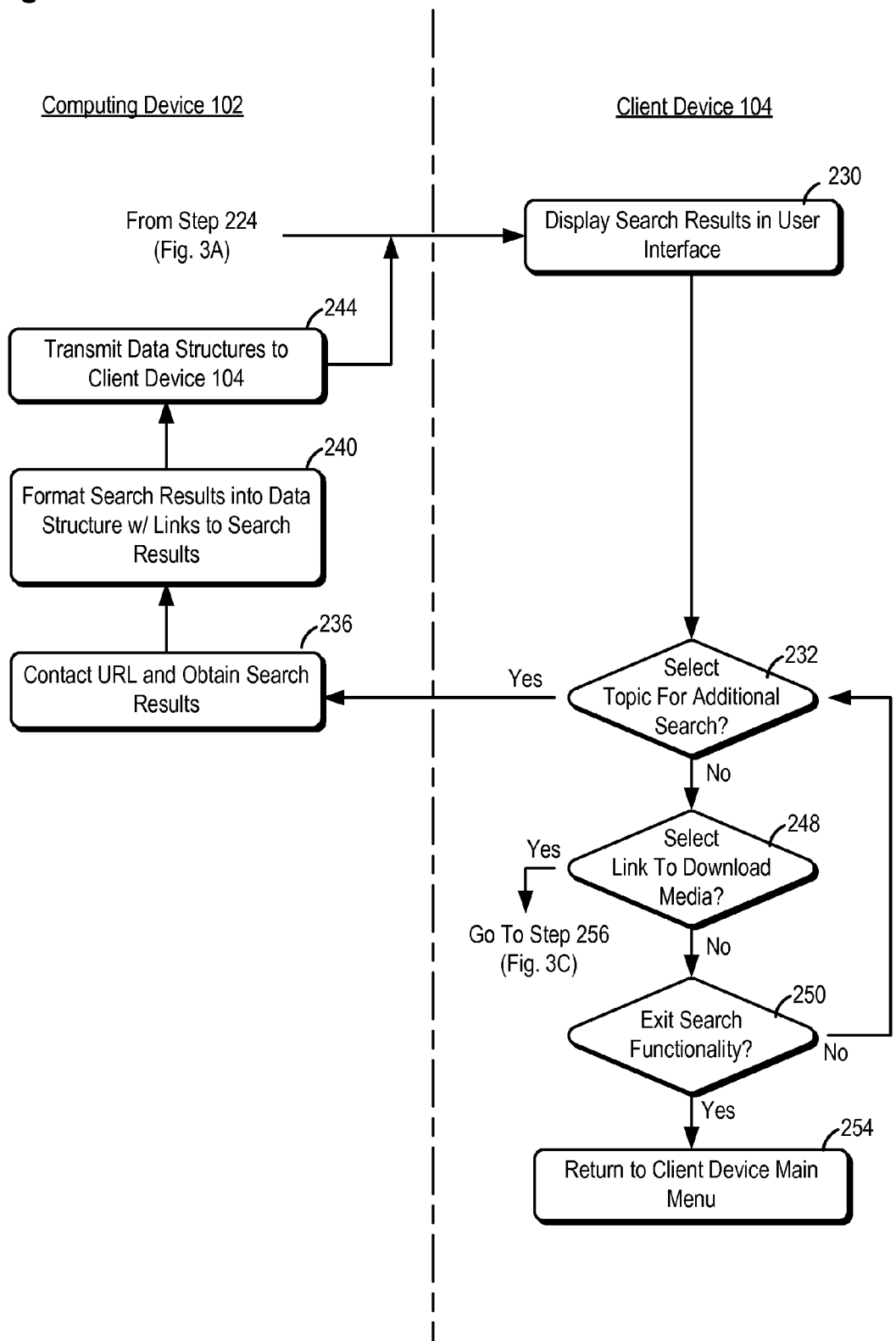

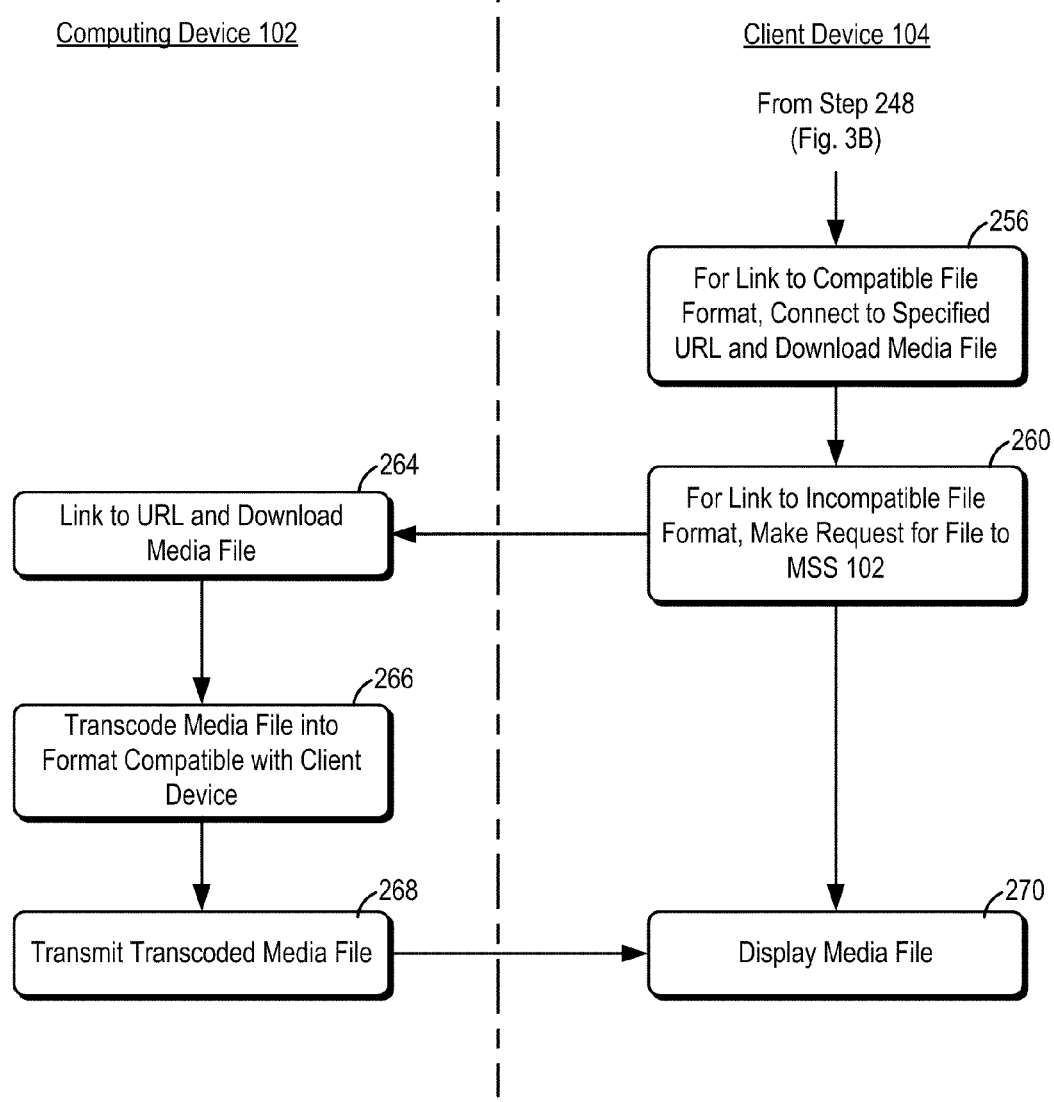

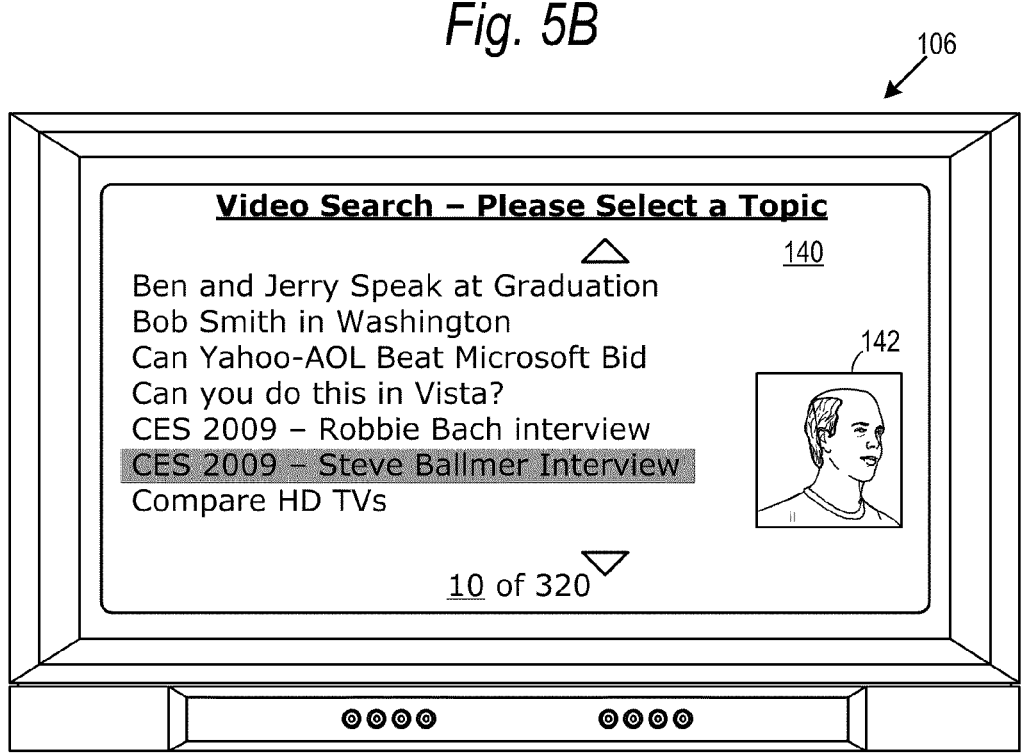
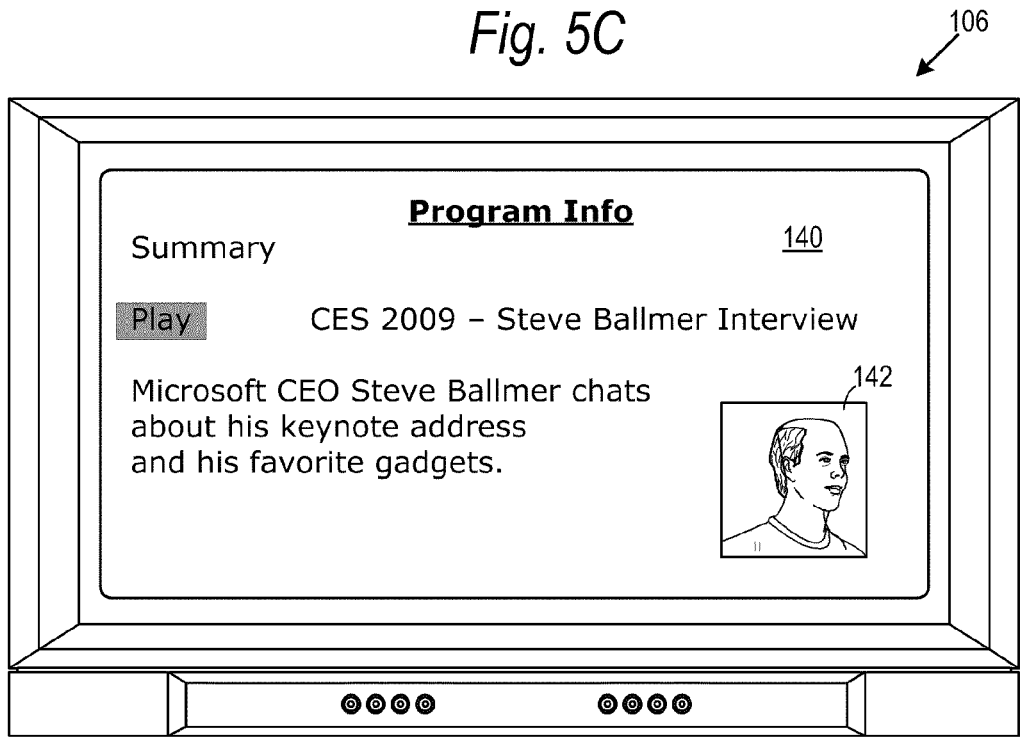

*(Step 346)*

MEDIA CONTENT RETRIEVAL SYSTEM AND PERSONAL VIRTUAL CHANNEL

BACKGROUND

Traditionally, people have experienced their home computers in a different way than they have their televisions. In particular, users have received broadcast content over their televisions, and have received Internet media content such as videos, photographs, music and audio files over their computers. However, there has been a recent push to merge the two experiences. More and more, people are using their televisions to receive traditional Internet content and their computers to receive traditional broadcast content.

One area that has remained largely within the purview of computers is that of Internet navigation and media searches. A reason for this is that traditional set top boxes (STB) used to receive television content have not been equipped with the processing power or browsing capabilities that typical computers have. One example of this is that set top boxes are able to play back only a limited number of the wide variety of media file formats that exist. Video files are encoded as Windows media video (WMV), flash video (FLV), MPEG video files, and many other formats. Audio files are encoded as Windows media audio (WMA), waveform audio format (WAV), and MPEG Audio Layer 3 (MP3) to name a few. And graphics files are stored as JPGs, GIFs, TIFs, etc. Conventional set top boxes support only a limited number of formats for each type of media.

While client devices such as set top boxes do have some Internet searching capabilities and are able to play back some types of media files, these abilities are limited. It is certainly possible to provide set top boxes with the same processing power and browsing capabilities as traditional PC computers. However, this would significantly add to the cost of set top boxes. Adding cost to set top boxes is contrary to the current trend, which is to provide set top boxes with the functionality of handling broadcast and certain types of downloaded content, but to otherwise keep them simple and inexpensive. Thus, in order to experience the wide variety of media files available over the World Wide Web, users still turn to their computers.

On the other hand, an area which has remained primarily within the purview of television is the ability to receive content without the user having to actively seek out and select all of the content they receive. While users can surf the web using their computer and receive only the content they are interested in, at the completion of one content piece, the user must actively select another content piece. Conversely, with television, a user can tune into a channel and then sit back and receive an unending flow of content selected by the broadcasters. While broadcasters offer a wide variety of content, users are not always able to find a channel broadcasting the particular content that the user is interested in.

SUMMARY

The present system, roughly described, relates to a system for media content search and retrieval, and a virtual television channel capable of using that system. The present system may be implemented on a media service server, such as for example a home PC and a client device, such as for example a set top box for a television system, a mobile telephone, a personal digital assistant or a gaming console.

A first aspect of the present system relates to a media download control engine which enables a client device with limited capabilities to play media content which comes from a website in a format not supported by the client device. The media download control engine initially controls the media search process by acting as an intermediary between the client device and the remote servers on which media content is stored. The media download control engine formats the requests for content that are made by the client device, so that a client device need only receive user selection and that selection is automatically routed to the media service server which handles the request and returns the requested information.

Links to specific media files are formatted by the media service server and then sent to the client device. The media service server is able to detect the client device's capabilities, and in particular which type of media files are supported by the client device. When a user selects a supported media file for download, the link to this content is provided to the client device from the media service server so that the client device requests the content directly from the remote server hosting the desired media file. On the other hand, if a user selects an unsupported media file for download, the link to this content is provided to the client device from the media service server so that the client device makes the request for the content to the media service server. The media service server then obtains the content from the remote server and transcodes it into a format supported by the client device. The transcoded file is then sent to the client device for playback.

The media download control engine provides users with the ability to search and download media content directly to their television systems. A second aspect of the present system may make use of the media download control engine to obtain media content and create customized virtual channels. The second aspect in particular relates to a virtual channel engine that schedules a continuous stream of content for the user, which content is selected based on topics of interest to the user. A user is prompted to enter a search query. Once the query is entered, a search engine returns results relating to that search query. In addition to the results from the root search query, additional queries may be derived from the root search query, and the results from the derived search queries may also be obtained.

Media content from the results of the root and derived search queries are then put together into media content programs for viewing by the user over a virtual television channel. The root and respective derived search queries may each form a different program on the virtual channel. Content is added to a program based on various criteria, including content duration and closeness of the result to the root and derived search queries. Once the programs are assembled, they are scheduled into the future, such as for example 1 to 2 weeks ahead. A user may view the schedule on an electronic program guide and select which of the programs he or she wishes to view or listen to.

BRIEF DESCRIPTION OF THE DRAWINGS

FIGS. 3A-3C are a flowchart of the operation of the media download control engine according to an embodiment of the present system.

DETAILED DESCRIPTION

Embodiments of the system will now be described with reference to FIGS. 1-11, which in general relate to a system for media content search and retrieval, and a virtual television channel capable of using that system. In a first aspect of the present system, a media download control engine enables a client device with limited capabilities to locate and play media content which comes from a website in a format not supported by the client device. The media download and control engine is hosted by a media service server, such as a PC, which directs the client device to make requests for unsupported media files through the media service server. The media service server obtains the unsupported media files and transcodes then into a format supported by the client device. The transcoded file is then sent to the client device for playing by the client device. A second aspect of the present system may make use of the media download control engine to obtain media content and create customized virtual channels. The second aspect in particular relates to a virtual channel engine that schedules a continuous stream of content for the user, which content is selected based on topics of interest to the user.

Figure 1:
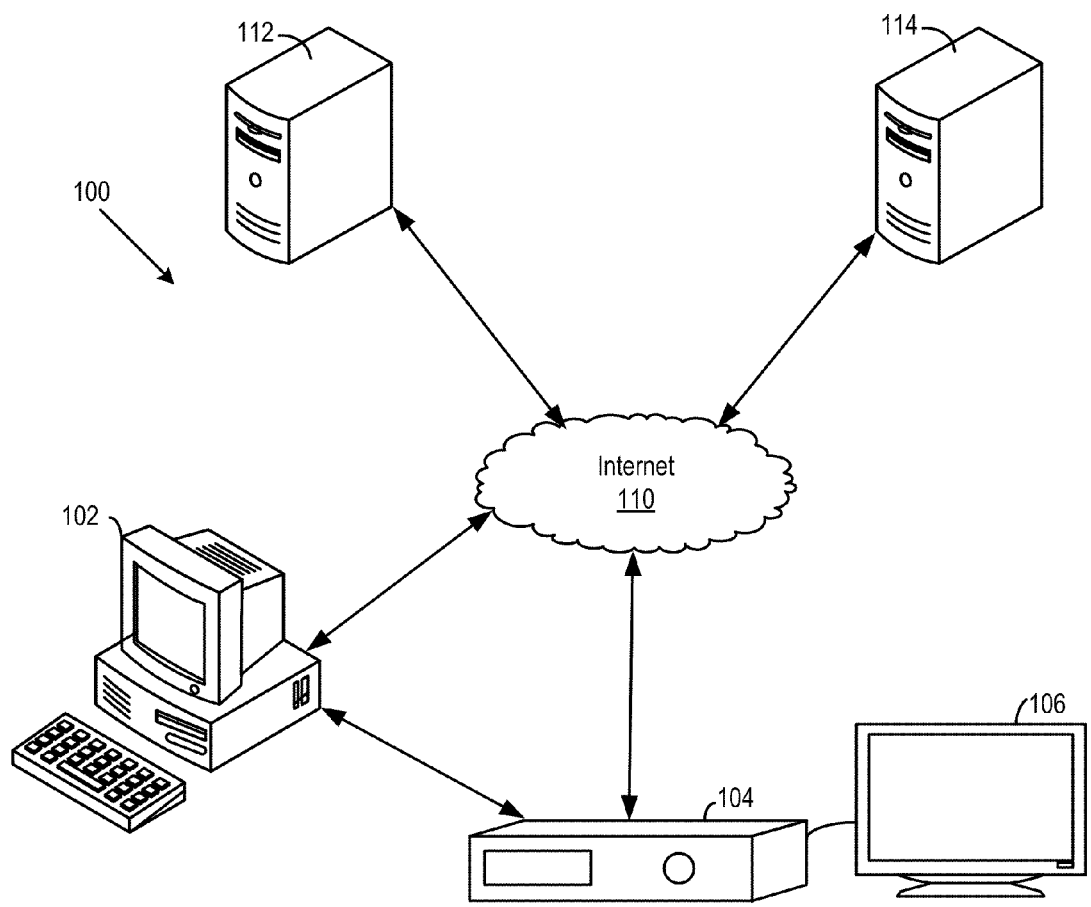
FIG. 1 is a block diagram of an architecture for a system according to an embodiment of the present system.

Referring initially to FIG. 1, there is shown system architecture 100 including a media service server 102 and a client device 104. In embodiments, the media service server 102 may be a computing device such as a traditional home PC, and the client device 104 may be a set top box attached to a display 106 which may be a television. A more detailed description of an embodiment where the client device 104 is a set top box is set forth below with respect to FIG. 11, and a more detailed description of an example of the media service server is set forth below with respect to FIG. 9. It is understood that client device 104 may be devices other than a set top box in alternative embodiments having limited processing capabilities in comparison to media service server 102. Such additional client devices may include but are not limited to mobile phones, personal digital assistants and gaming consoles such as for example the Xbox™ gaming system from Microsoft Corporation.

The media service server 102 and client device 104 may be located in a user's home and are networked to each other, as by a wired or wireless network connection. The devices 102 and 104 are also each connected to the Internet 110, where they are able to access different web servers, including a media server 112 providing video-on-demand (VOD) and other services, and a portal 114 including a search engine capable of performing web searches. The media server 112 may include a media delivery engine to manage delivery of media content to the media service server 102 and/or client device 104 based on requests received for the content media. The portal 114 may include a search engine having a webcrawler application capable of searching the World Wide Web for media files, and an index for storing the location of media files.

Figure 2:
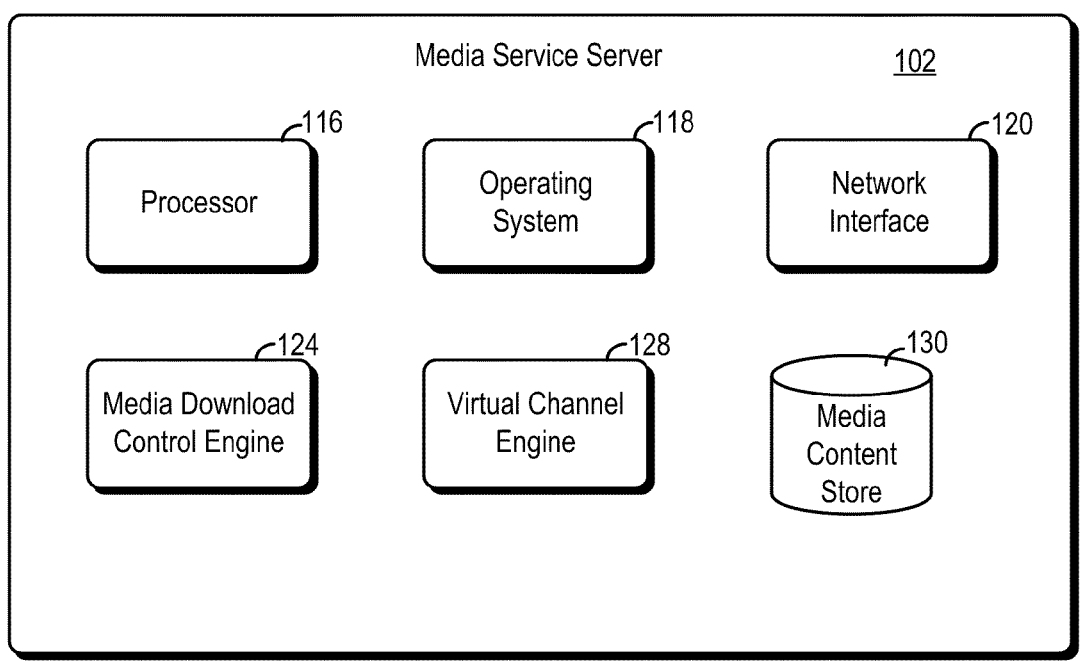
FIG. 2 is a block diagram of a media service server according to an embodiment of the present system.

Referring now to FIG. 2, media service server 102 may in general include one or more processors 116, as well as an operating system 118. A network interface 120 may further be provided to enable communication between the media service server 102, the client device 104 and other computing systems. The media service server 102 further includes a number of software application programs executed on processor 116. These application programs include a pair of client applications in accordance with the present system. Each of these client applications is explained in detail below, but in general the first application, referred to herein as media download control engine 124, allows the client device 104 to perform media searches and play back media which may exist on a remote source server in a file format that is not supported by the client device 104. The second client application, referred to herein as virtual channel engine 128, allows a user to create a virtual television channel presenting a constant stream of content relating to a search query on a topic of interest to the user.

In embodiments, both the media download control engine 124 and the virtual channel engine 128 may be resident on media service server 102, but it is understood that the software engines 124, 128 may be stored on different servers from each other in alternative embodiments. In one such embodiment, the virtual channel engine may be resident on the client device 104.

Although media service server 102 may be a user's home PC, the media service server 102 may alternatively be a dedicated application server. Such a dedicated application server may be located in the user's home, or, in further embodiments, the media service server may be remote from the user's home. That is, the media download control engine and/or the virtual channel engine may be located on a remote server of a telephone company or other service provider. In such embodiments, the remote server may communicate with the client device 104 via the Internet or other network connection. Moreover, while media service server 102 is shown associated with a single client device 104, there may be more than one client device associated with media service server 102 in further embodiments.

The media service server 102 further includes a data store 130 for storing media content and metadata relating to the media content. Such metadata may include title, cast, production and other data relating to the stored media content in the media service server data store 130. The metadata allows the processor 116 to generate an interactive electronic programming guide ("EPG") which presents a schedule of content to be displayed over the television 106. This content may be stored in data store 130, or downloaded at the appropriate time from media server 112 or portal 114 (FIG. 1). As explained hereinafter, a user may generate a customized virtual channel using the virtual channel engine 128. The media content selected for the virtual channel, as well as the metadata for the virtual channel, may be stored in data store 130. In an alternative embodiment, the data store 130 may be resident in the client device 104.

Figure 3A:
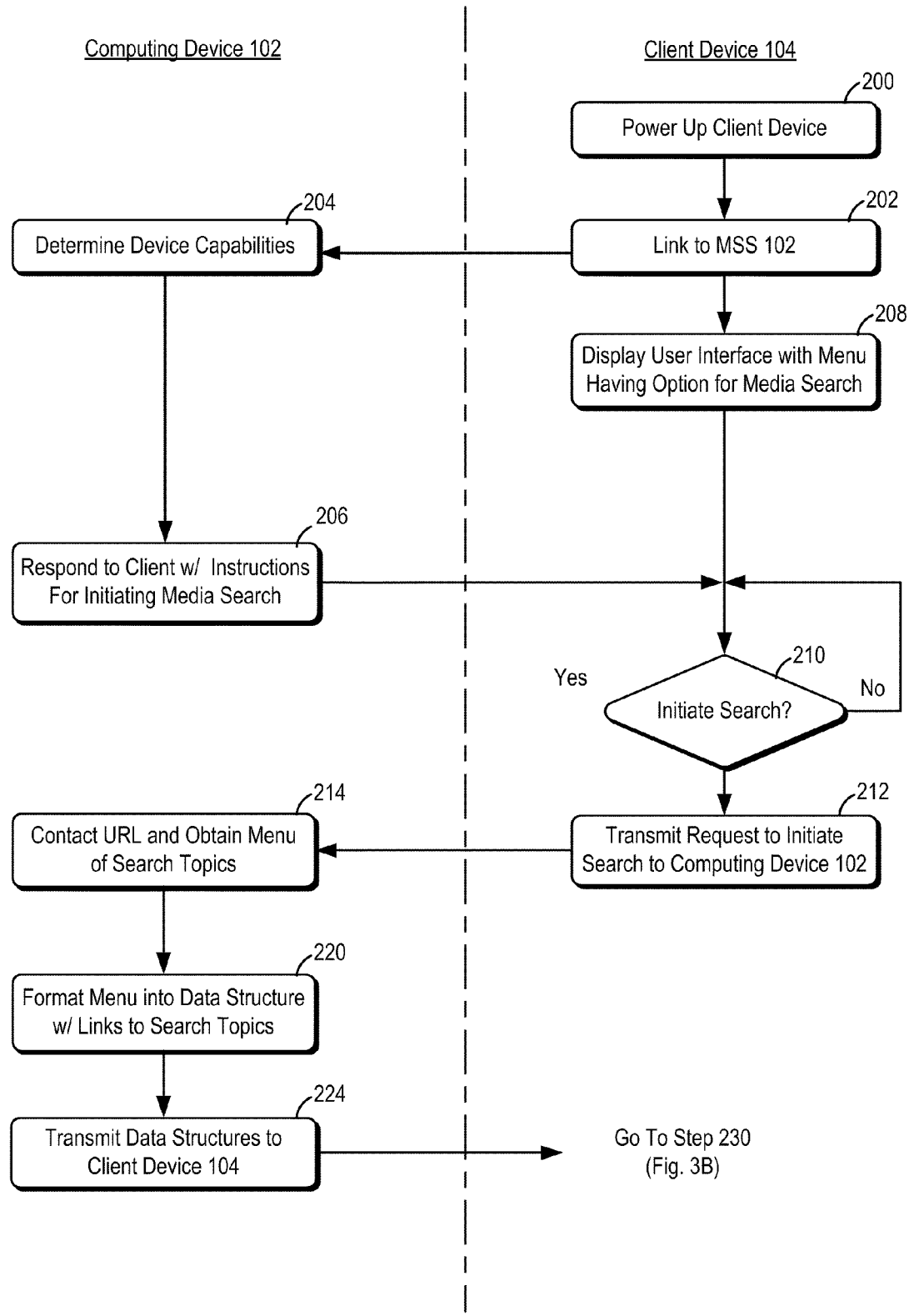
Figure 4:
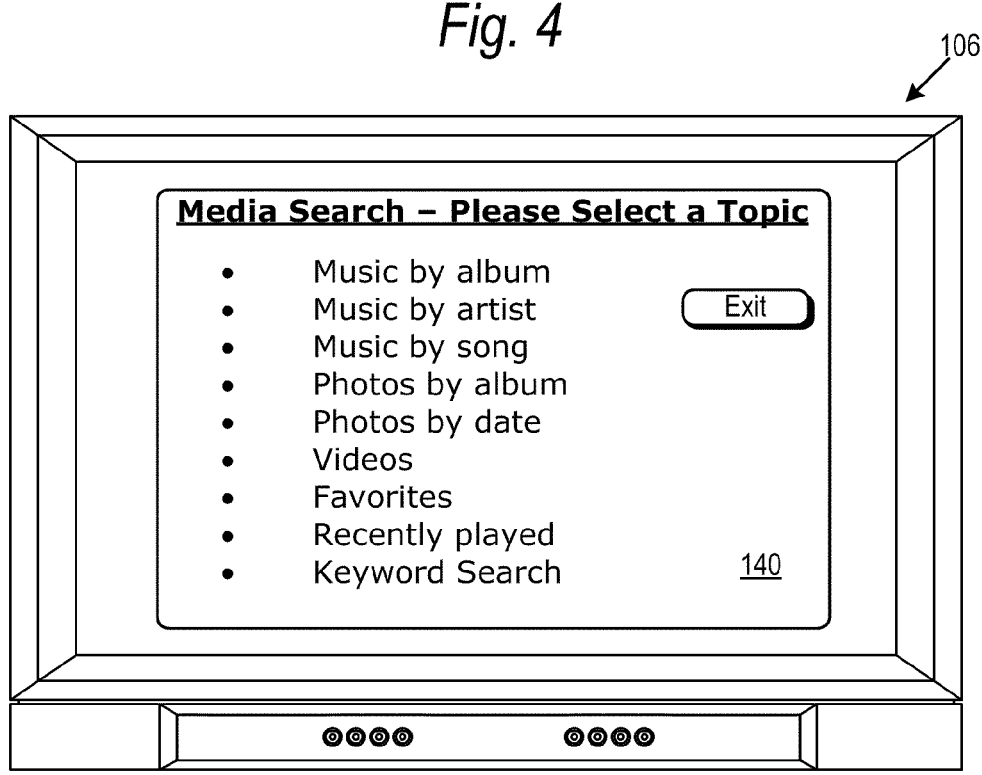
FIGS. 4-5C are illustrations of graphical user interfaces presented by the media download control engine according to an embodiment of the present system.

Operation of the media download control engine 124 will now be explained with reference to the flowchart of FIGS. 3A-3C and the user interface illustrations of FIGS. 4 and 5. Once the software engine 124 is installed and running on media service server 102, upon power up of the client device 104 in step 200, the client device may call out to other devices in the local area network and link to the media service server 102 in step 202. The client device may use a simple service discovery protocol (SSDP), which provides a mechanism allowing the client device to discover network services including the existence of media service server 102. Protocols other than SSDP may be used for the client device 104 to find the media service server 102.

Upon linking to the client device 104, the media service server 102 determines the client device 104 capabilities in step 204. The media service server 102 may include a user agent as is known in the art for detecting the client device capabilities, including which media file formats the client device is compatible with (i.e., which media file formats the client device supports and is able to play). In step 206, the media service server 102 responds with a broadcast message providing instructions to the client device 104 that, when initiating a media content search, the client device 104 is to send its request to the media service server 102.

In step 208, the client device 104 transmits data to the television 106 in order to generate a user interface on television 106 in a known manner. The user interface presents the user with a main menu including an option to perform a media search. The user may interact with this user interface via a remote control associated with the client device 104 and/or television 106. In step 210, the client device 104 determines whether the user wishes to initiate a media search. Upon receipt of an indication that the user would like to perform a media search in step 210, the client transmits a request to the media service server 102 in step 212 to initiate the search.

The request sent in step 212 is generated in accordance with the instructions initially transmitted from the media service server 102 in step 206 (i.e., to contact the media service server when a search is to be initiated).

Upon receipt of the notification from the client device that the user wishes to initiate a media search, the media service server 102 connects with a predetermined web URL to obtain a menu directory of media search topics in step 214. The predetermined web URL may be the address of the portal 114 (FIG. 1). Web portal 114 may be any of various existing search engine portals such as for example MSN.com hosted by Microsoft Corporation. The media service server 102 stores the location of a home page or main search page of portal 114, and downloads the list of search topics from the designated web page in step 214. The page to which the media service server 102 connects may also be customized home page of the user on the portal. The media service server 102 may include a known browser application which is able to contact the predetermined website, request the media search directory and receive the responsive information from the website.

In step 220, the media service server 102 formats the obtained list of search topics into a data structure which will allow the client device 104 to make selections from the list and obtain further results per the selected topic or topics. As one of many examples, the media search directory may download topics such as the following:

Music by album
Music by artist
Music by song
Photos by album
Photos by date
Videos by title
Favorites
Recently played
Keyword search It is understood that the media directory list may include additional or alternative topics in further embodiments. A user can tailor the topics retrieved by the media service server 102 using the client device user interface or the media service server directly.

As indicated, in step 220, the media service server 102 formats the data for the media directory into respective data structures for each topic. Each data structure specifies a given topic, and also provides a URL link to the URL where the given topic is stored on the portal 114. Once the media directory data is formatted into data structures, the data structures are sent to the client device in step 224. The following is an example of an XML version of the various data structures that are formatted by the media service server 102 and which are sent from the media service server 102 to the client device 104:

```
<MediaMenu xmlns="http://schemas.datacontract.org/2004/07/"
    xmlns:i="http://www.w3.org/2001/XMLSchema-instance">
  <List>
<Children>
<CAMLNode>
  <Title>music by album</Title>
  <Url>http://157.56.144.163:9999/xm/albums?dp=STB;SL;1024;768;32;Xml&requesttoken=</Url>
</CAMLNode>
<CAMLNode>
  <Title>music by artist</Title>
  <Url>http://157.56.144.163:9999/xm/artists?dp=STB;SL;1024;768;32;Xml&requesttoken=</Url>
</CAMLNode>
<CAMLNode>
  <Title>music by song</Title>
  <Url>http://157.56.144.163:9999/xm/allsongs?dp=STB;SL;1024;768;32;Xml&requesttoken=</Url>
</CAMLNode>
<CAMLNode>
  <Title>photos by album</Title>
  <Url>http://157.56.144.163:9999/xp/photoalbum?dp=STB;SL;1024;768;32;Xml&requesttoken=</Url>
</CAMLNode>
<CAMLNode>
  <Title>photos by date</Title>
  <Url>http://157.56.144.163:9999/xp/root?dp=STB;SL;1024;768;32;Xml&requesttoken=</Url>
</CAMLNode>
<CAMLNode>
  <Title>videos by title</Title>
  <Url>http://157.56.144.163:9999/xv/root?dp=STB;SL;1024;768;32;Xml&requesttoken=</Url>
</CAMLNode>
<CAMLNode>
  <Title>favorites</Title>
  <Url>http://157.56.144.163:9999/favorites?dp=STB;SL;1024;768;32;Xml&requesttoken=</Url>
</CAMLNode>
```

```
<CAMLNode>
  <Title>recently played</Title>
  <Url>http://157.56.144.163:9999/recents?dp=STB;SL;1024;768;32;Xml&requesttoken=</Url>
</CAMLNode>
<CAMLNode>
  <Title>Search</Title>
  <Url>http://157.56.144.163:9999/Search?dp=STB;SL;1024;768;32;Xml&requesttoken=</Url>
</CAMLNode>
<CAMLNode>
  <Title>MSN Video</Title>
  <Url>http://157.56.144.163:9999/msn video?dp=STB;SL;1024;768;32;Xml&requesttoken=</Url>
</CAMLNode>
<CAMLNode>
  <Title>MSN Photos</Title>
  <Url>http://157.56.144.163:9999/msn photos?dp=STB;SL;1024;768;32;Xml&requesttoken=</Url>
</CAMLNode>
  </Children>
  <Total>11</Total>
  <Class>list</Class>
  </List>
<ViewStyle>XB</ViewStyle>
<Class>menulist</Class>
</MediaMenu>
```

In the above XML code, each topic in the media directory is embedded in a data structure. In each topic, CAMLNode is a definition of the respective data structures. Following that is a topic title, and following that is a content link specifying a URL for that topic at the predetermined website. The beginning of the link in each data structure ("157.56.144.163:9999" in this example) is the local address of the media service server 102 detected by the client device when it initially linked to device 102 in step 202. As explained below, the media directory including the topics in the data structures are displayed by the client device 104 over television 106, and a user may select a topic for further exploration. The inclusion of the local address of the media service server in each data structure causes the client to route any requests for additional information on a topic through the media service server 102.

The above is one example of the data structures which can be passed from the media service server to the client device to specify a variety of media topics. It is contemplated that the topics for the media search may be communicated from the media service server to the client device in other data formats. Moreover, while the above is in XML, other language protocols may be used. As a further example, if the client device 104 supports the SilverLight® browser plugin by Microsoft Corporation, then the data structures may be communicated using JSON as the language protocol between the media service server 102 and the client device 104.

In step 230 (FIG. 3B), the client device receives the data structures and generates a user interface in a known manner on the television 106. An example of this user interface 140 is shown in FIG. 4. The client device takes the media directory topics from the data structure and displays them in a user-friendly manner over the user interface 140.

In step 232, the client device 104 determines whether the user has selected a displayed topic for further searching. If so, the client device 104 makes an HTTP request to the media service server 102 for the additional information associated with that topic. In particular, the data structures provided by the media service server 102 to the client device 104 include the list of topics and a link to the URLs where the additional information for those topics may be found. Thus, when a user selects a given topic, the client device receives an indication of the selection from user interface 140, and then follows the link associated with the selected topic.

As indicated above, the link within each data structure also includes the local address of the media service server 102, so all requests for additional information on a topic are routed through the media service server 102. By formatting the links in the data structures sent to the client device, the client device need not process how, where or by what route to obtain the additional information.

The client device simply follows the links specified in the data structure associated with each topic.

Using the URL received from the client device 104, the media service server 102 contacts the server at the specified URL address and obtains the search results with the additional requested information in step 236. In step 240, the additional information for the specified topic may be formatted in a data structure as described above. Namely, the data structure may include a title for the additional information and a link where the additional information can be obtained by the media service server 102 if selected by the user via the client device 104.

The data structures for the additional requested information are transmitted from the media service server 102 to the client device 104 in step 244. The following is an example of an XML version of the additional information for a selected topic sent from the media service server to the client device. In this example, the user has selected "MSN Video" from the media directory displayed on the user interface.

```
<MsnVideoMediaMenu xmlns="http://schemas.datacontract.org/2004/07/MSN.VideoPlugin"
    xmlns:i="http://www.w3.org/2001/XMLSchema-instance">
  <Header xmlns="http://schemas.datacontract.org/2004/07/">
    <Title>MSN Video</Title>
    <Class>header</Class>
    </Header>
  <List xmlns="http://schemas.datacontract.org/2004/07/">
    <Children>
```

```
<CAMLNode>
    <Poster />
    <Title>What's Hot</Title>
    <Url>http://157.56.144.163:9999/msn
        video/genre?dp=STB;SL;1024;768;32;Xml&requesttoken=&name=What's Hot</Url>
<CAMLNode>
<CAMLNode>
    <Poster />
    <Title>News</Title>
    <Url>http://157.56.144.163:9999/msn
        video/genre?dp=STB;SL;1024;768;32;Xml&requesttoken=&name=News</Url>
<CAMLNode>
<CAMLNode>
    <Poster />
    <Title>Money</Title>
    <Url>http://157.56.144.163:9999/msn
        video/genre?dp=STB;SL;1024;768;32;Xml&requesttoken=&name=Money</Url>
<CAMLNode>
<CAMLNode>
    <Poster />
    <Title>Sports</Title>
    <Url>http://157.56.144.163:9999/msn
        video/genre?dp=STB;SL;1024;768;32;Xml&requesttoken=&name=Sports</Url>
<CAMLNode>
<CAMLNode>
    <Poster />
    <Title>Celebrity</Title>
    <Url>http://157.56.144.163:9999/msn
        video/genre?dp=STB;SL;1024;768;32;Xml&requesttoken=&name=Celebrity</Url>
<CAMLNode>
<CAMLNode>
    <Poster />
    <Title>Movies</Title>
    <Url>http://157.56.144.163:9999/msn
        video/genre?dp=STB;SL;1024;768;32;Xml&requesttoken=&name=Movies</Url>
<CAMLNode>
<CAMLNode>
    <Poster />
    <Title>Music</Title>
    <Url>http://157.56.144.163:9999/msn
        video/genre?dp=STB;SL;1024;768;32;Xml&requesttoken=&name=Music</Url>
<CAMLNode>
<CAMLNode>
    <Poster />
    <Title>TV</Title>
    <Url>http://157.56.144.163:9999/msn
        video/genre?dp=STB;SL;1024;768;32;Xml&requesttoken=&name=TV</Url>
<CAMLNode>
<CAMLNode>
    <Poster />
    <Title>Life</Title>
    <Url>http://157.56.144.163:9999/msn
        video/genre?dp=STB;SL;1024;768;32;Xml&requesttoken=&name=Life</Url>
<CAMLNode>
<CAMLNode>
    <Poster />
    <Title>Autos</Title>
    <Url>http://157.56.144.163:9999/msn
        video/genre?dp=STB;SL;1024;768;32;Xml&requesttoken=&name=Autos</Url>
<CAMLNode>
<CAMLNode>
    <Poster />
    <Title>Soapbox User Videos</Title>
    <Url>http://157.56.144.163:9999/msn
        video/genre?dp=STB;SL;1024;768;32;Xml&requesttoken=&name=Soapbox User Videos</Url>
<CAMLNode>
    </Children>
  <Total>11</Total>
  <Class>list</Class>
    </List>
<ViewStyle xmlns="http://schemas.datacontract.org/2004/07/">XB</ViewStyle>
<Class xmlns="http://schemas.datacontract.org/2004/07/">menulist</Class>
    </MsnVideoMediaMenu>
```

Figure 5A:
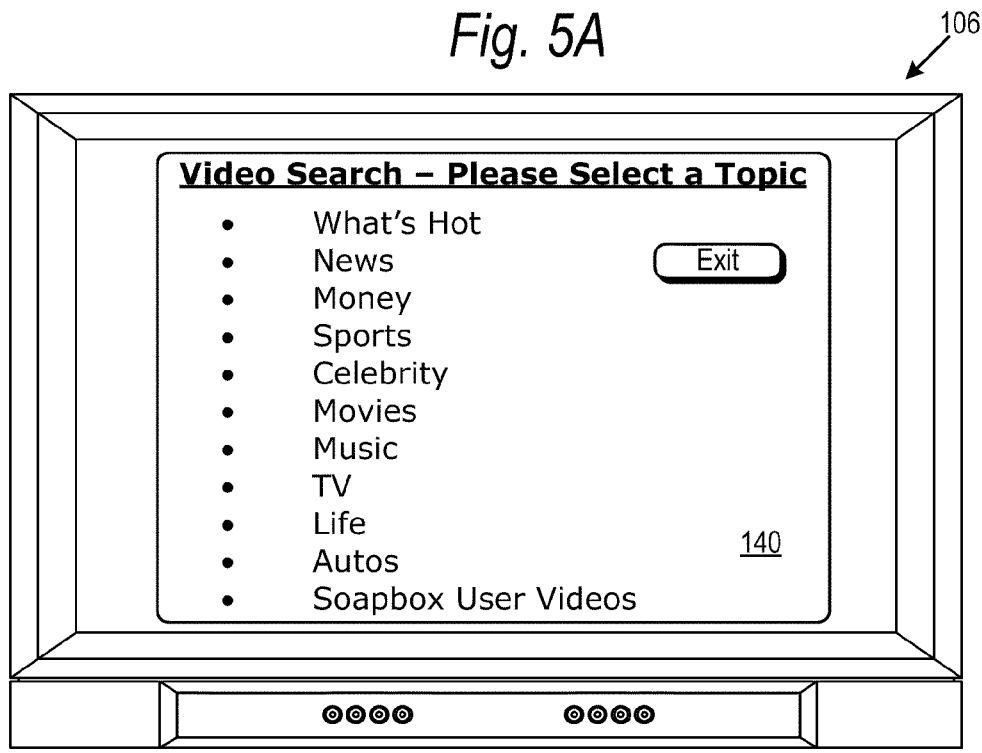

As above in step 214, the media service server 102 formats the returned information into data structures and then forwards the data structures to the client device 104. The additional information is then displayed by the client device 104 in a user-friendly format over the user interface 140 in step 230 as described above. An example of the additional information which may be displayed on user interface 140 is shown in FIG. 5A. As indicated in the above data structures, the media service server can also return "posters" as well as thumbnails and descriptions (shown in FIGS. 5B and 5C) so that the client can display a rich user interface. The user can then make further selections from additional information displayed over the user interface 140. Steps 230-244 may be repeated as often as the user wishes to focus the media search to specific content the user wishes to view and/or hear.

One exception to focusing a user search by repeating steps 230-244 is where a user selects a keyword search instead of a general media topic. In the event the user selects a keyword search, the user interface displays a window within which the user can enter the search. The user can then enter a text query, using a keyboard or remote control associated with the client device 104 and/or television. If no keyboard is present, the client may instead generate a soft keyboard on the user interface from which the user may select text to formulate the query. The search query is then sent to the media service server 102, which passes the query to the predetermined web portal 114 for the web portal search using the web portal search engine. The results of the search are returned to the client device 104, which formats the results in a data structure for example as described above. The formatted results are then sent to the client device 104 for display over the user interface 140 in a user-friendly format.

Using the above-described steps, a user is able to select a topic or keyword search, and the client device 104 passes the request on to the media service server 102. This process may go on for several steps until the user arrives at a video, music or image the user wishes to download. With this system, the client device 104 does not know which server it is communicating with. The client device merely makes a request to the URL associated with a selected topic. The media service server 102 controls the flow by controlling the URL set in the "URL" section of the CAMLNode.

This provides a significant amount of flexibility. For example, as explained below, this system provides the ability for the client device 104 to play media content which comes from a site in a format not supported by the client device.

If the user does not select an additional search for information in step 232, the media download control engine 124 next determines whether the user has selected a link to download specific media in step 248. If not, the engine 124 checks in step 250 whether the user wishes to exit the search for media (an exit option may be provided on user interface 140). If so, the client device 104 returns to the main menu screen (not shown) in step 254 and the media download control engine 124 ends.

However, assuming the user selects particular media to download in step 248, the media is downloaded and played. FIGS. 5B and 5C illustrate examples of the user interfaces 140 a user may be presented with as a result of his or her selections so as to arrive at content the user wishes to play. Assume a user has selected "Videos" from the user interface shown in FIG. 4, and then "News" from the user interface shown in FIG. 5A. The media service server 102 may then obtain a list of videos, which are then forwarded for display on interface 140 as shown in FIG. 5B. A user may scroll though the list, and select a video of interest. As indicated above, thumbnails 142 or other graphics may accompany the content list. In this example, the user has selected a video of an interview with Microsoft's Steve Ballmer. Once selected, the media service server 102 may retrieve a summary page with a summary of the content, such as shown in FIG. 5C. If a user elects to view that content, the media file for that content is then obtained and played over the user's television 106 as described below with respect to steps 256-270 in FIG. 3C. It is understood that the user interface screens 140 shown in FIGS. 4-5C are by way of example only, and that a wide variety of alternative and/or additional user interface screens may be presented to the user to allow the user to navigate to desired content.

As indicated above, the media service server 102 is aware of the capabilities of client device 104, and in particular, the media service server 102 is aware of what file types the client device is capable of playing. When the media service server 102 sends the data structures with a list of media files to the client device 104 for review by the user, the media service server sends a list of both supported and unsupported media files. For those media files the computing system knows are supported by the client device, the computing system formats the link in the data structure for that file so that the client device can go get that media file itself That is, if a media file is in a format that the client device can play, then the link in the data structure from media service server 102 for that media file will point directly to the remote server where that file is located. Thus, if a user selects a supported file for download, the selected link points directly to the remote server, and the request is made directly from the client device 104 to the remote server. The remote server then downloads (or streams) the file directly to the client device 104 (step 256).

On the other hand, the list sent by the media service server may include links to media files that are in a format that the client device cannot play. For these unsupported files, the media service server 102 encodes the associated data structure with a link pointing back to the media service server. That is, the link in the data structure sent to the client device 104 will include the local address of the media service server 102. Thus, if a user selects an unsupported file for download, the selected link points to the media service server 102, and the client device 104 makes the request to the media service server 102 for the media service server to obtain the file (step 260). The media service server then contacts the specified website and downloads the unsupported file to the media service server 102 (step 264).

Upon receipt, the media service server transcodes the media file in step 266. The transcoding process takes the original media file and generates a new media file in a format supported by the client device. Methods of transcoding media files from one format to another format are known in the art. There are many existing schemes of transcoding content, some can take advantage of changing client network conditions and provide adaptive control (i.e., variable bit rate when available network bandwidth falls). The media service server 102 could use this type of transcoding, as well as any other known transcoding scheme.

Once the file is transcoded, the media service server 102 may store the transcoded file in a storage location on media service server 102. The link sent from the client device points to this storage location. Thus, once the file is transcoded, the file may be sent to the client device 104 in step 268 for playback in step 270. As used herein, playback or playing of a media file means displaying a video on television 106 (or other monitor) and/or playing audio over speakers associated with the television 106 (or other device). In a further embodiment, the media service server 102 could transcode the content "on the fly" in real time without having to wait for the file to be transcoded. In such embodiments, the client will be able to start viewing the content prior to having all the source content transcoded.

As one example, a client device 104 may support Windows media video (WMV) but not flash video (FLV). If a user selects an FLV video file (or other unsupported file format) for download from a remote server, the data structure link selected at the client device 104 will direct the media service server 102 to obtain the file from the remote server. Upon receipt, the media service server 102 will live transcode the .flv video file into a new file having a format the client device supports (e.g., .wmv), and send the transcoded .wmv file to the client device. The client device can then play the transcoded video in step 270. On the other hand, if the user sought to download a file in a supported format (e.g., .wmv) from a remote server, the client device 104 would download the .wmv file directly from the remote server without the assistance of the media service server. It would then play the .wmv video in step 270. A similar process may be performed for supported/unsupported audio files, supported/unsupported graphics files and supported/unsupported text files.

Where a client device 104 supports multiple formats for a given media, there may be a default supported file format to which unsupported file formats are transcoded. Alternatively or additionally, the media download control engine 124 may employ rules in transcoding unsupported file formats to a supported file format. For example, where it is known that a given file format transcodes more cleanly into a supported file format other than the default file format, the engine 124 may transcode the unsupported file format into the file format having the cleaner transcoding.

The above system provides users with the ability to search and download media content directly to their television systems. This provides users with increased flexibility in their content searching experiences, and enables a variety of Internet search applications to be performed from a television system. One such application in accordance with the present system is the virtual channel engine 128 mentioned above with respect to FIG. 2 and explained now in greater detail with respect to FIGS. 6 and 7. While embodiments of the virtual channel engine 128 make use of the above-described media download control engine 124, it is understood that the virtual channel engine 128 need not use the media download control engine 124 in alternative embodiments of the present system.

In general, virtual channel engine 128 allows a user to enter a search query using the client device 104 indicated above, and the engine 128 then generates programs relating to the search query. The engine 128 schedules those programs and makes them available for viewing by the user over his or her television. The schedule of assimilated programs may be listed under a new, virtual channel in an EPG shown to the user along with scheduled content on other channels.

Figure 6A:
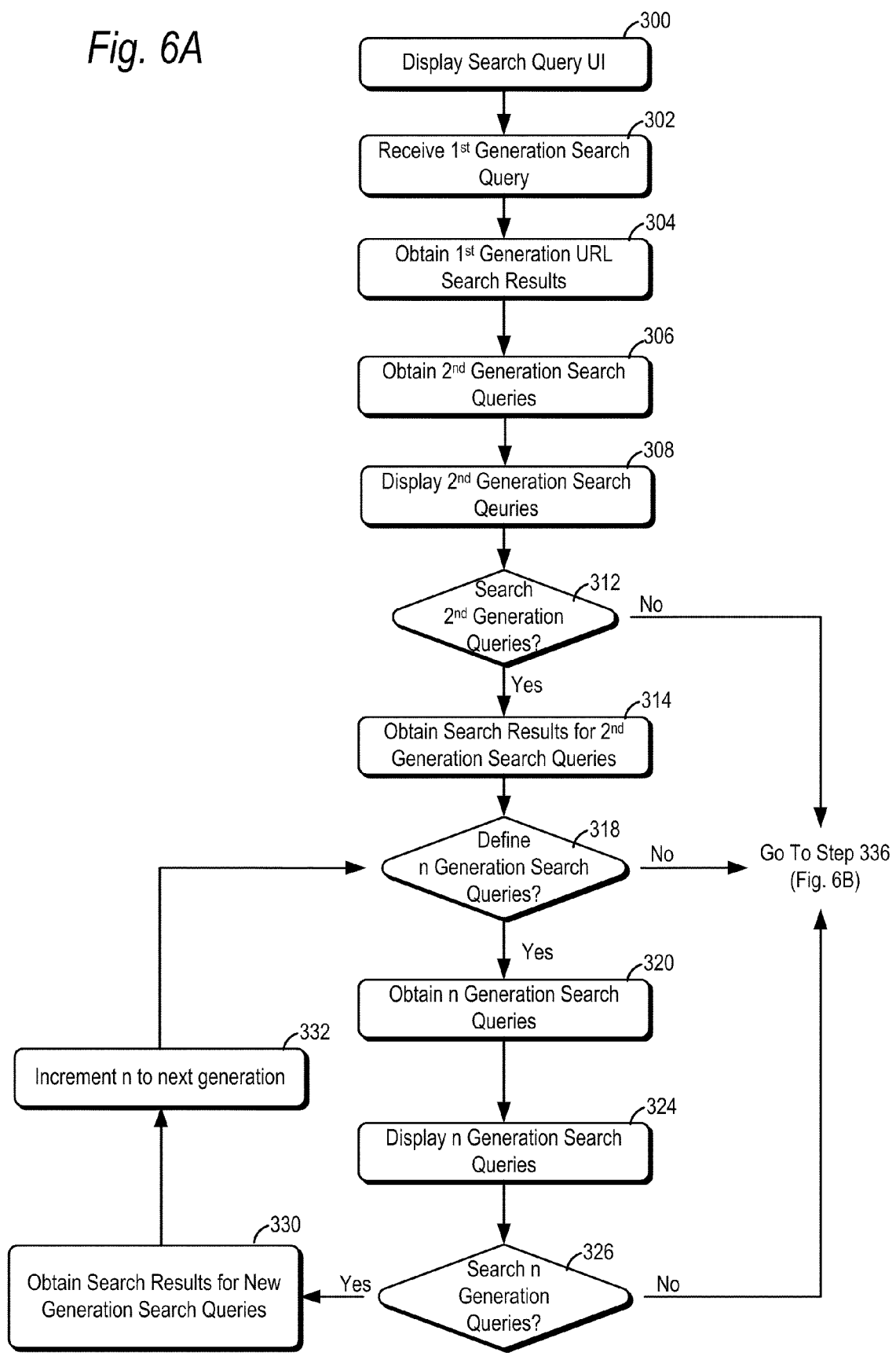
FIGS. 6A-6C are a flowchart of the operation of the virtual channel engine according to an embodiment of the present system.

The operation of virtual channel engine 128 will now be described with reference to the flowchart of FIGS. 6A-6C and the user interfaces of FIGS. 7-9. It is understood that the virtual channel engine 128 may be carried out by the media service server 102, the client device 104, or a combination of the two. It is also contemplated that the virtual channel engine 128 be located on a remote server which the user can access and run the routine to create one or more virtual channels.

In step 300, the engine 128 displays a user interface allowing the user to enter a desired search query. In particular, where the virtual channel engine 128 is hosted on the media service server 102, the device 102 sends a message to the client device 104, which in turn sends a message to the television 106 to generate the user interface on television 106. Where the virtual channel engine 128 is resident on the client device, the client device sends a message to the television 106 to generate the user interface on television 106.

Figure 7:
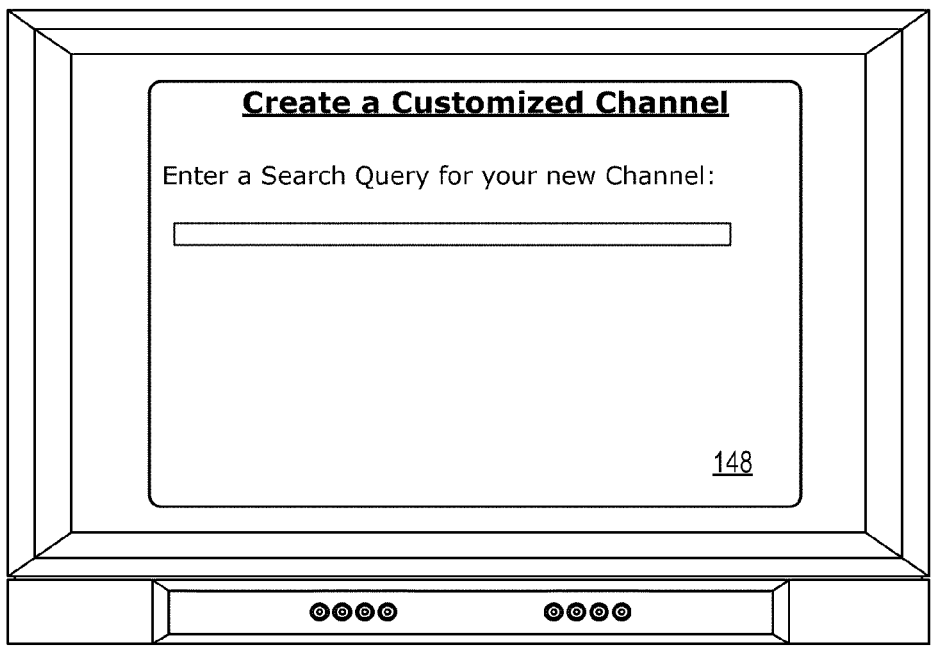
FIGS. 7 and 8 are illustrations of graphical user interfaces presented by the virtual channel engine according to an embodiment of the present system.
Figure 8:
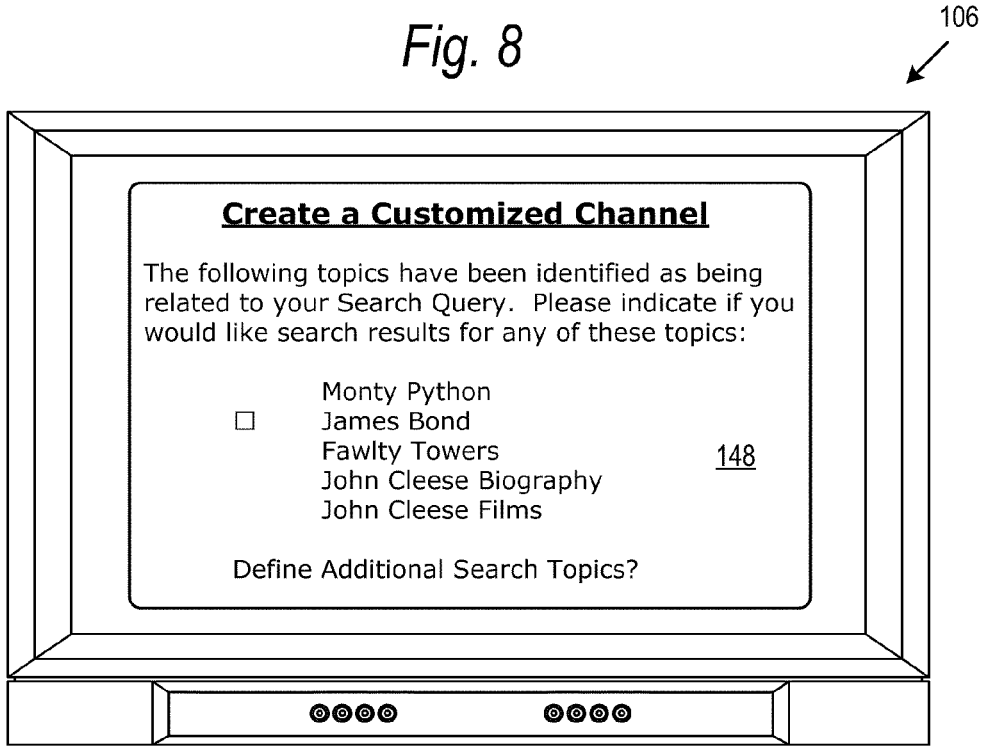

An example of such a user interface 148 is shown in FIG. 7. The user enters a search query using a keyboard associated with the client device 104 or television 106. Alternatively, where there is no keyboard, a soft keyboard may be displayed on interface 148 which the user can interact with using their remote control. Upon receipt of a search query in step 302, a search of that query is performed via a remote search engine website, such as for example that supported by portal 114 (FIG. 1). Searches may relate to people, movies or shows, music, events, or any other topic of interest to a particular user. The specific search query entered by the user is referred to herein as the root search query or the $1^{st}$ generation search query.

The results of the $1^{st}$ generation search query are received in step 304. As is normal for search engine search results, the results obtained will be ranked in order of relevance, and may include links to text files, video files, graphics files and audio files. In embodiments, programs included on the virtual channel are formed only from the video files. However, it is understood that a program may be formed that includes video files, graphics files, audio files, text files, or any combination thereof. In embodiments, a user may limit the search to only one type of media, e.g., video. In these embodiments, the programs will be compiled from only the selected media type. Other search criteria may also be employed to refine the search results. Such additional criteria include duration of the search result, aspect ratio of the search result, resolution of the search result, source from which the search results are obtained, and genre of search result (e.g., movie, music video, documentary, news, etc.). Other search criteria may be used.

Search queries relating to popular search topics may generate a large corpus of material from which programs may be formed as explained below. However, it may happen that a search query may yield few results, or that a user wishes to branch out to obtain search results from different search queries that are related to the root search query. As such, the virtual channel engine 128 may obtain additional results using a $2^{nd}$ generation search query.

In particular, the search may be performed by the search engine using a metadata mining engine that is capable of deriving search queries that are related to the original root search query. Such a metadata mining engine may use various known algorithms for obtaining derived search queries that relate to the root search query. In general, the metadata mining engine may examine the logs of search queries from the search engine to determine derived search queries that are related to the root search query. The relation may be semantic, contextual, temporal or other known correlation for determining derived search queries from a root search query. Search queries derived from the root search query are referred to herein as the derived search queries or the $2^{nd}$ generation search queries.

In one example, the mining engine may be that used on an existing search website, such as for example the Wikipedia® search site. In such an example, the mining engine may take the $1^{st}$ generation search query and search through an index of queries on that search site that have results including a link back to the $1^{st}$ generation search query. As one example, a user may enter the name of the actor "John Cleese" as the $1^{st}$ generation root search query. The mining engine would then search through the results for other queries to see which of them include a link back to John Cleese. As one example, the search queries "Monty Python" and "James Bond" may both have search results including the name "John Cleese," as well as a link to the John Cleese page. These search queries would then form at least part of the $2^{nd}$ generation search queries. The mining engine may also generate $2^{nd}$ generation search queries relating to wide variety of other topics, such as for example "John Cleese biographies," and "John Cleese films." It is understood that the derivative search queries may be determined according to a wide variety of other schemes.

Figure 11:
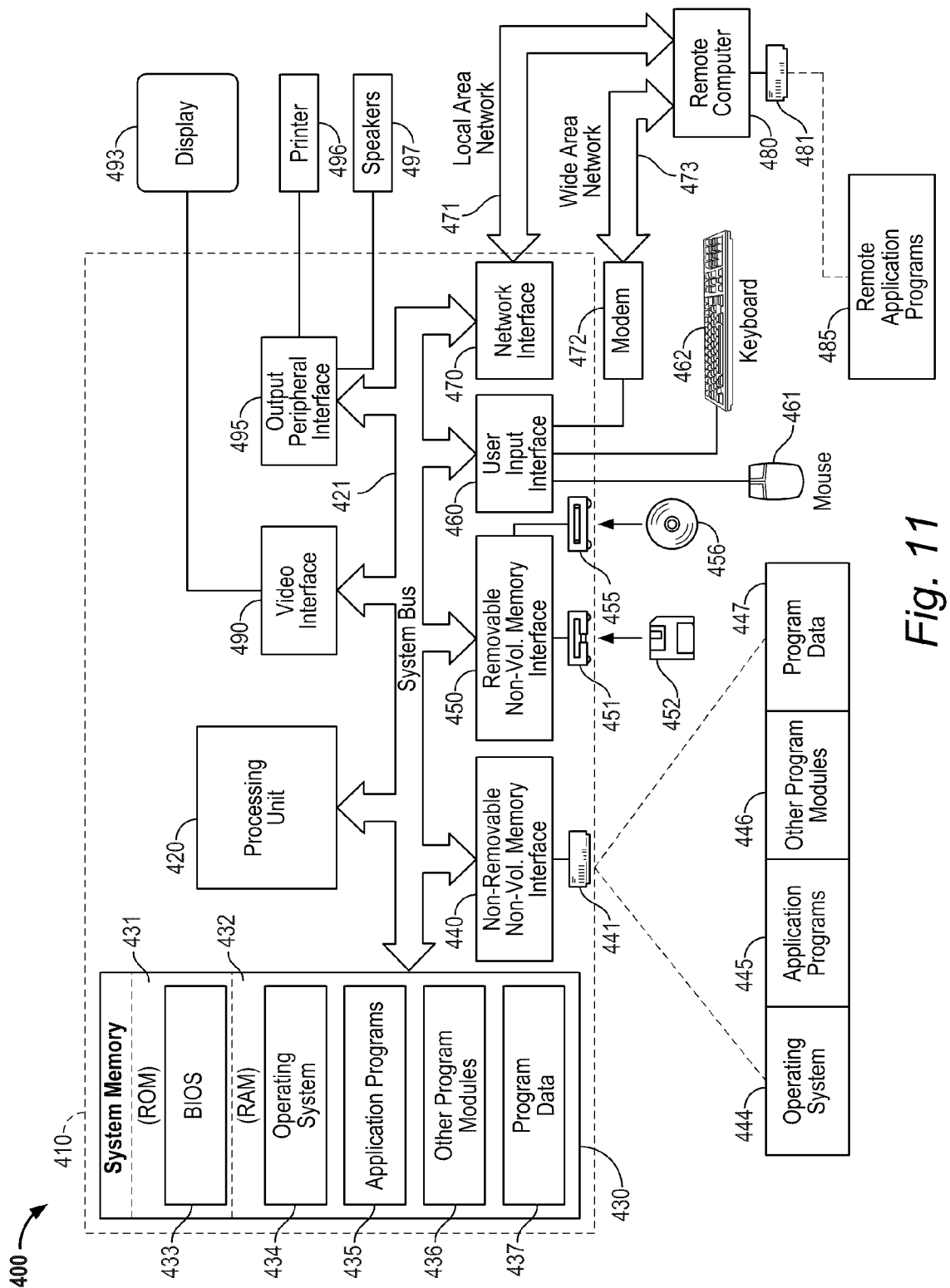
FIG. 11 is a block diagram of a computing environment for implementing local set top box ad insertion according to an embodiment of the present system.

In embodiments, the generation of $2^{nd}$, $3^{rd}$, etc. generation search queries may be controlled by the user. In alternative embodiments explained below, the virtual channel engine may create generational search queries from the root search query automatically. In an embodiment where the user controls the creation of further generation search queries, after the user enters the $1^{st}$ generation root search query, the $2^{nd}$ generation search queries may be obtained in step 306 and displayed to the user in step 308 over user interface 148 on the television 106. Such a user interface 148 is shown in FIG. 11, using the above example of $1^{st}$ and $2^{nd}$ generations of search queries. The user is given the option to select one or more of the $2^{nd}$ generation search queries to search (step 312). If the user elects not to search any $2^{nd}$ generation queries, the search ends and the root search query and its results are stored (step 336, FIG. 6B). On the other hand, if the user elects to search one or more of the $2^{nd}$ generation search queries, the search results for each selected $2^{nd}$ generation search query are obtained in step 314.

As shown in FIG. 11, the user is also given the option to create further generation search queries (step 318). For example, a set of $3^{rd}$ generation (n=3) of search queries would be search queries that the metadata mining engine determines are related to one of the $2^{nd}$ generation search queries. Each $2^{nd}$ generation search query may result in a set of $3^{rd}$ generation search queries. Thus, the search queries may branch out exponentially with each successive generation.

Steps 318-332 represent the steps for generating n generation search queries and results. The $2^{nd}$ generation search queries were obtained in step 306, so the first time through steps 318-332, n begins at 3 (i.e., $3^{rd}$ generation), and increments one generation each time through the loop. Thus, the first time through steps 318-332, the user indicates whether he or she wishes to see $3^{rd}$ generation search queries (step 318). If so, $3^{rd}$ generation search queries are obtained in step 320. In step 324, the $3^{rd}$ generation of search queries are displayed to the user over user interface 148 (FIG. 11). The user is then given the option to search the $3^{rd}$ generation of search queries (step 326).

Figure 6B:
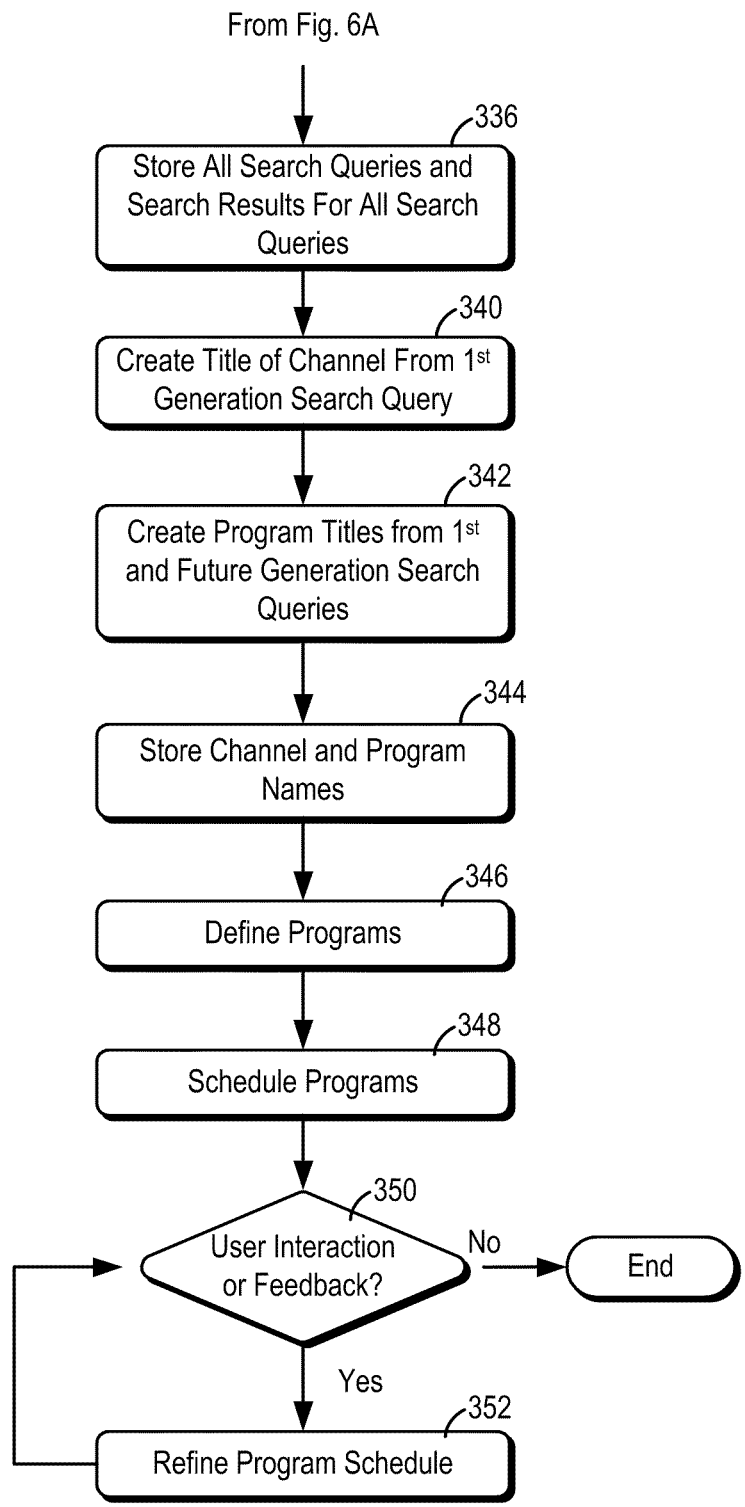
Figure 6C:
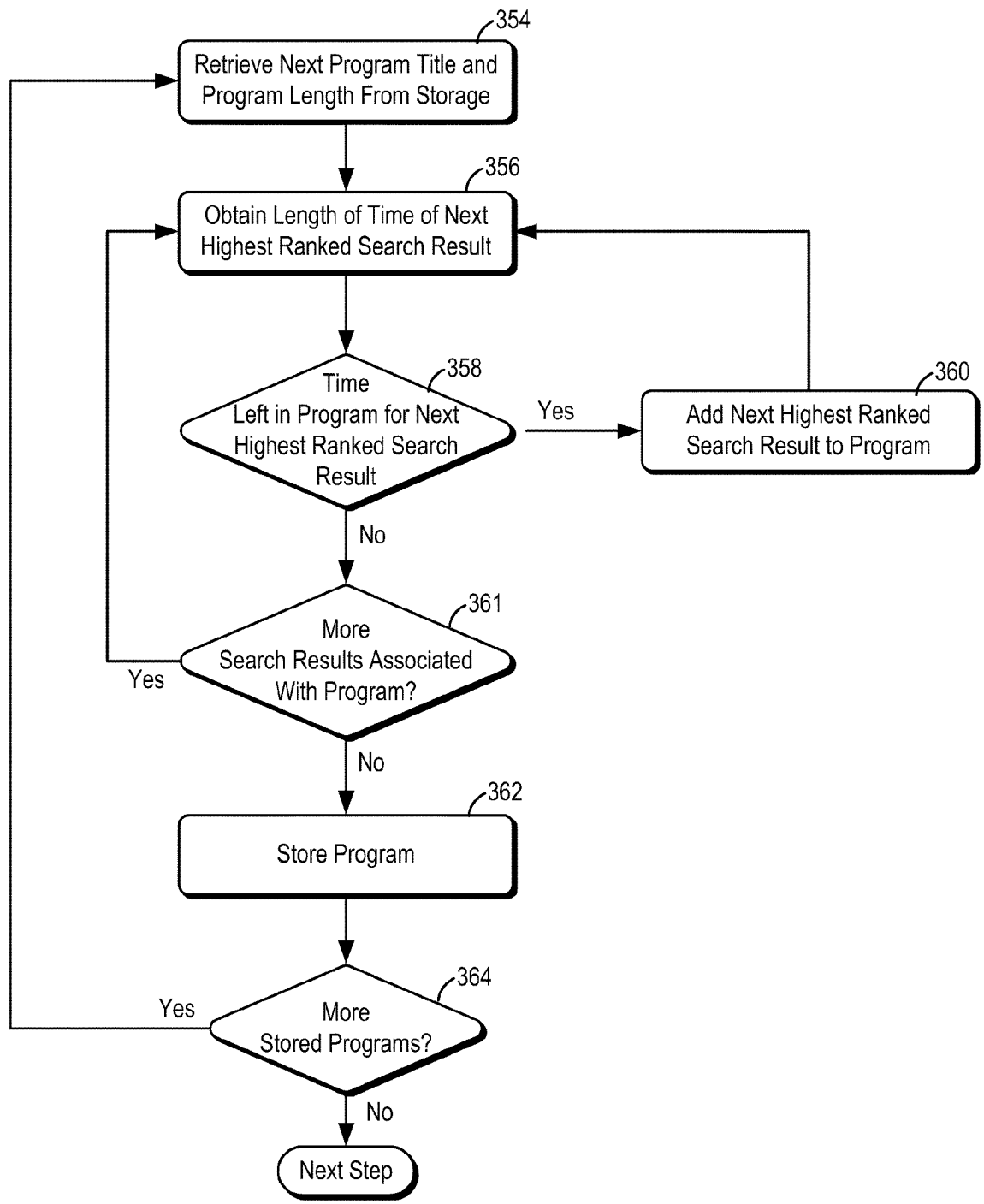

If the user does not select any of the $3^{rd}$ generation queries to search, all of the search queries ($1^{st}$ and any selected $2^{nd}$ generation queries) and results obtained for these search queries are stored (step 336, FIG. 6B). On the other hand, if the user elects to search one or more of the $3^{rd}$ generation search queries in step 326, the search results for each selected $3^{rd}$ generation search query are obtained in step 330. The generation counter, n, is then incremented (e.g. to $4^{th}$ generation) in step 332, and the routine returns to step 318. With n=4, the user is again given the option to obtain the $n^{th}$ generation of search queries in step 318, where the $n^{th}$ generation of search queries are the search queries derived from each of the n−1 generation of search queries. The then process proceeds again through steps 318-332.

In practice, it may be rare that derived search queries more than 2 to 3 generations out would need to be obtained. However, it is contemplated that steps 318 to 332 may be repeated as often as the user wishes to obtain as many generations of search queries and results as the user would like. In embodiments, the results for generational searches beyond the $2^{nd}$ generation may cross-referenced against the root search query to ensure that the remote generational search results bear some relation to the root search query (though this cross-referencing may be omitted in embodiments).

In embodiments, instead of the user deciding how many generations of search results he or she would like, the virtual channel engine may automatically generate one or more generations of search queries and search results. In this embodiment, a variety of criteria may be employed to determine how many generations of search terms are used. In one embodiment, searches of the root and derived search queries may be performed until there is enough content to form programs lasting a predetermined period of time in aggregate, for example a few hours, a day, a week or a few weeks. Thus, if a search result produces content that, when formed into programs, lasts for the predetermined period of time, no further generations of searches need be performed.

In a further embodiment, different generations of searches may be performed to ensure there is a variety of different content relating to the original search query. Thus, in the above example of John Cleese, providing results relating to John Cleese, Monty Python and James Bond provides a good cross-section and variety of content relating to John Cleese.

The search results obtained for the root and any derived search queries are obtained through a search of the World Wide Web by a search engine of the portal 114. In addition to these search results, the virtual channel engine 128 may also search for relevant content stored within a content store in the local storage on media service server 102 and/or client device 104. The engine 128 may also search the schedule of upcoming content on other IP or network broadcast channels to find relevant content (i.e., content or metadata for the content which includes the root or derived search query terms). Content from any of these sources may be included within a program as explained below.

Referring now to FIG. 6B, upon completion of the search process, all search queries for the first and any additional generations are stored, together with the search results for these search queries (step 336). Thereafter, in step 340, the name of the virtual channel is defined. The virtual channel may take the same name as the root query. Thus, in the above example, the virtual channel engine 128 may create a virtual channel called "John Cleese." The name of the virtual channel corresponding to long search terms may be truncated.

In step 342, program titles for the various programs may be created. In one embodiment, the program titles may take the same name as the root search query and any derived search queries. Each search query may be used to form a different program name. Thus, in the above example, programs may be created called "John Cleese," "Monty Python," "James Bond," "John Cleese Biography" and "John Cleese Films." These program names are by way of example only. In step 344, the name of the virtual channel and program titles may be stored in the data store 130 in media service server 102, or it may be stored in a data store of the client device 104 or on a remote server. Search results for a given search query are linked in memory with the program name corresponding to the given search query.

In step 346, content for the programs may be added to the programs. Further details of one embodiment of step 346 are shown in the flowchart of FIG. 6C. In this embodiment, program names are successively retrieved from memory in step 354. Thus, in the above example, the first program name is "John Cleese." The length of the program is also retrieved. Programs may be set to predefined lengths (e.g., ½ hour, an hour, two hours, etc.). All programs may be set to the same length, or different programs may be different lengths.

In order to add content to a program, the length of the next highest ranked search result for a given program is taken (step 356). This measure is returned as part of the metadata associated with a search result. A check is then made in step 358 to see if there is sufficient available time in the current program to add the next highest ranked search result to the program. If there is, the content is added to the program in step 360, and the routine returns to step 356 to check the next highest ranked search result. If there is not room for the next ranked content, the routine checks if there are more results associated with the current program title in step 361. If there is, the routine goes back to step 356 to check if next search result fits within the program.

Thus, in one example, the first program may be set to be ½ hour. The virtual channel engine retrieves the first program and retrieves the length of time for the first ranked search result associated with that program. The engine determines the first ranked search result is a 10 minutes long video. As it is the first content to be added to the ½ hour program, and the content length is less than ½ hour, it is added to the program. The length of time of the second ranked search result is then taken. If it is less than 20 minutes long (the time remaining in the program after the addition of the first content piece), the second content piece is added. If a content piece is too long for the time remaining in a program, that content piece is skipped and the next content piece is considered. A skipped content piece may be tagged for first addition to a program if and when a program is modified (as explained below).

The process of steps 356-361 continues until the ½ hour of the program in this example is filled with content. As lower down search results may be not very relevant to a program, the virtual channel engine may truncate the results to consider, for example, to only the first 20 results. The truncation line may be omitted, or may be more or less than 20 results, in further embodiments. A small time buffer may be added to each content piece to prevent a rushed transition between content pieces. When a program is completed (no more content to fit within the allotted time), it may be stored in step 362.

It may happen that a few minutes are left in a program and it may be difficult to find content that will fit into that few minutes. This may be handled one of many ways. Advertisements may be selected to fill the few minutes. Alternatively, the length of time of a program may be shortened or lengthened to fit the length of the content pieces within the program. As another option, content may be added, but only part of it is included in the program.

After a program is stored, the virtual channel engine may next see if there are more stored programs to add content to in step 364. If so, the routine returns to step 360 to add content for the next program as explained above. If there are no more programs, step 346 of adding content to programs is completed. In embodiments, what is stored is the name of a program, and links to the content pieces that are included in that program. As explained below, when a program is played, the engine may go out and get the content from the stored link. In an alternative embodiment, the actual content itself may be downloaded when a program is created and stored as part of a program.

In the above example, higher ranked search results are compiled into a program before lower ranked search results. It is understood that content may be added to programs according to other steps in further embodiments. As one alternative, instead of adding content pieces to a program by their rank, a group of content pieces associated with a given program may be selected whose time in aggregate add up to the length of time of a program. As content may be left over after the above processes, a program may either be made longer, or different episodes of the program may be created so that the program becomes a series.

While programs may typically be made up of only video or video and audio files, programs may also include text and or graphics files. For text and/or graphics files, a default display period of time may be assigned to each file, depending on the size of the file. Thus, shorter text or graphics files may be displayed, for example for 30 seconds, and longer text or graphics files may be displayed longer. The time periods for displaying text or graphics files may then be counted when including such files in a program.

Returning to FIG. 6B, after programs are created, the programs may next be scheduled in step 348. Programs may be added to the schedule so that the most closely related programs to the original root search are first in the schedule, and less closely related programs are scheduled later. The virtual channel engine may build up a schedule of programs to last different periods of time into the future, but may be about 1-2 weeks into the future. After all of the programs in a schedule have been played, the schedule may be repeated. As time passes, unwatched programs can be repeated. Moreover, as explained below, the virtual channel engine includes a feedback mechanism. Watched programs given a high rating may be added again to the schedule and repeated. Skipped programs, or those given a low rating, may be omitted from the schedule going forward.

Figure 9:
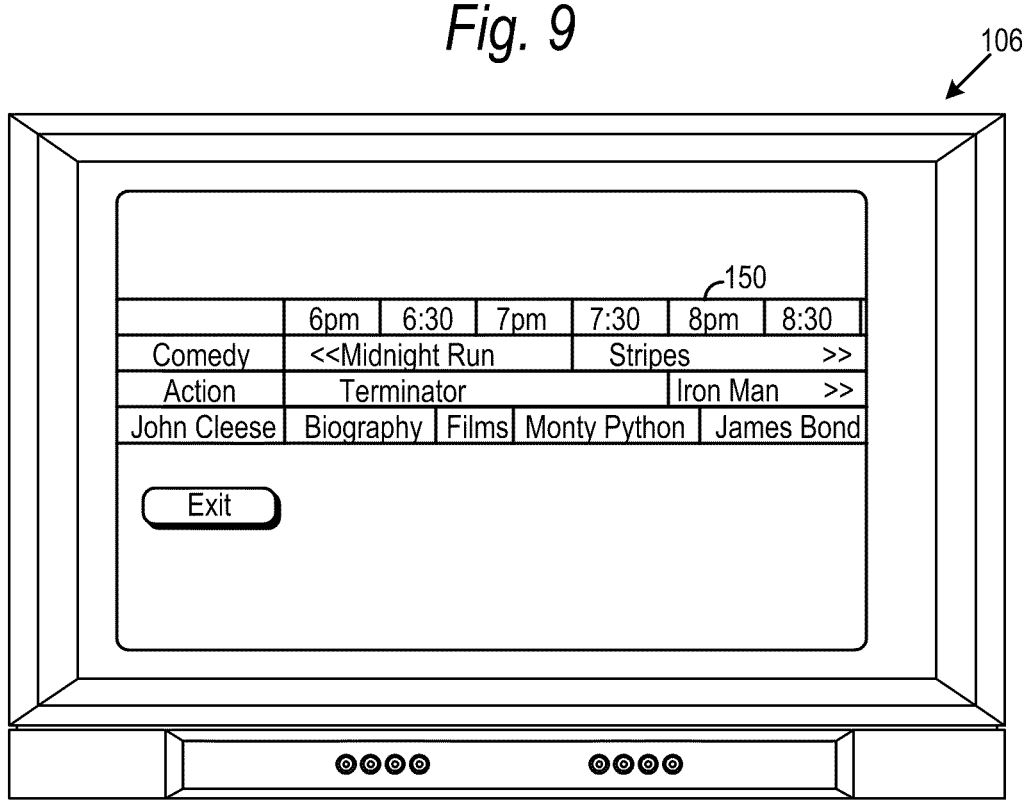
FIG. 9 is an illustration of an electronic program guide on a graphical user interface presented by the virtual channel engine according to an embodiment of the present system.

An example of a schedule of programs for the created virtual channel of the above example is shown in the user interface EPG 150 in FIG. 9. The EPG 150 in general may be a grid including schedule times shown horizontally across the top and the various available channels vertically down a side. The EPG 150 of FIG. 9 is a simple example, but in general, the EPG may have a large number of channels though which the user may scroll and select content for viewing over their television 106 at a particular time. The EPG is populated with content information received from a variety of external sources including network broadcasters (ABC, NBC, etc.) via a cable or satellite service provider, or from a web server (such as server 112) streaming Internet Protocol television (IPTV). The EPG may also be populated with information from local storage (e.g. storage 130) resident on the media service server 102 and/or client device 104.

Recorded media content may have embedded data such as subtitles, teletext or other data components that can be searched to indicate that this content is relevant to the current search query. The subtitles, teletext or other data can be decoded by a search indexer and used to index a specific program for a given search query. For example, where the user has a personal search channel for John Cleese, the user may have a recorded news program that includes a subtitle stream. This subtitle stream could be read into a subtitle decoder and the resultant text can be used by the search indexer to index this specific recorded program content. As another example, if a news article covers John Cleese then this can be indexed and this content can be potential content to be used for the personal search channel.

The client device 104 receives EPG content data for the EPG 150, as well as metadata from the external and/or internal sources. This metadata relates to the scheduled content on the various channels, and may include for example title, synopsis, genre, category, classification, review, cast, crew, artist, producer, time, duration, location, content type, content provider, source, resolution, cost, subscriber, or other data relating to particular media content. Although not shown in the EPG 150 of FIG. 9, this metadata may also be made available to the user through interaction with the EPG 150 via the user's remote control.

In accordance with the present system, the virtual channel engine 128 may add a new channel to the EPG 150 which is shown along side the other channels available on the EPG 150. Upon completion of step 348, the virtual channel engine 128 may add the new channel name to EPG 150, along with the schedule of programs available on the channel, which information is stored on media service server 102, client device 104 or on a remote server. Continuing with the above example, a channel called "John Cleese" was created, and various programs are shown by their scheduled times. The EPG 150 in FIG. 9 includes only a few programs, but there may be many more.

When it comes time to watch a particular program, the media service server 102 or client device 104 may contact the source server having the content included in the program, and the device 102 or 104 may then download (or stream) the content for that program. The download or streaming of content may be accomplished by the media download control engine 124 and steps 248 and 256-270 of FIGS. 3B and 3C described above with respect to the media download and control engine 124. Namely, supported file types may be obtained by, and downloaded or streamed directly to, the client device 104. Some of the files used within a program may be in formats that are not supported by the client device 104. These files may be sent to the media service server 102 for transcoding, and then sent to the client device 104. It is understood that the virtual channel engine 128 may be used in embodiments without the media download control engine. In such embodiments, programs that are added to a virtual channel may be limited to content supported by the client device 104.

All of the content for a program may be downloaded from the different sources at the start of the program, or the content may be streamed from the different sources at the time a particular content is to be shown during a program. In further embodiments, the content for upcoming programs may be downloaded in advance of its scheduled viewing time, transcoded (if necessary) and stored on media store 130 in media service server 102 or within client device 104. Space may be provided between or during programs for insertion of advertisements. In embodiments, the advertisements may be targeted to individual users based on the content selected for their programs.

As indicated above, the virtual channel engine 128 may allow for feedback on content within a given program and/or on programs as a whole. Feedback may be received in step 350. Such feedback may be passive; that is, the client device 104 detects the user's viewing patterns of program content. A user may skip through a content piece or an entire program. Alternatively, a user may rewind or fast forward through a portion of a content piece or program. The engine 128 causes this passive feedback to be stored, and uses it to modify the schedule over time to further customize the virtual channel to a particular user's tastes (step 352). Alternatively, feedback in step 350 may be active. The user may be given the option to expressly rate content that is presented to the user. Such feedback may be obtained via a user interface that is displayed to a user upon completion of a program.

Using the virtual channel engine 128, a user may create a channel that schedules a continuous stream of content for the user, which content is selected based on topics of interest to the user. Once the user inputs his or her search query and selects any derivative search queries, the virtual channel and programs are automatically created and the user is provided with the programs without further interaction on the user's part. While the above example shows the creation of a single virtual channel, it is understood that the above, steps may be used to create a number of virtual channels on any topics of interest to the user. Each of these virtual channels will appear in the EPG 150, and the user can select content for viewing on a single channel or switch between them.

In the embodiments described above, programs for a virtual channel are scheduled at particular times. However, in an alternative embodiment, programs may be generated as described above, but instead of being scheduled, these programs may be stored in a storage local to the media service server 102 and client device 104, or on remote media server 112. In this embodiment, the content programs may be made available as on-demand content, and selected on-demand for viewing at any time the user wishes.

In embodiments, virtual channels are personal to each user. However, in a further embodiment, an individual user's virtual channel lineup may be uploaded and stored in a backend server, for example media server 112 (FIG. 1). Thereafter, where a subsequent user enters a search query to create a virtual channel, the subsequent user's client or media service server may call to the backend server to check if any other users have entered the same search query in creating a virtual channel. If so, the virtual channel engine 128 can construct a new virtual channel for the subsequent user from the stored program data associated with the early creation of a virtual channel from the same root search query.

The above described media download control engine 124 and virtual channel engine 128 may be described in the general context of computer executable instructions, such as program modules, being executed on media service server 102, client device 104 or a remote server such as media server 112. Generally, program modules include routines, programs, objects, components, data structures, etc., that perform particular tasks or implement particular abstract data types. The present system may also be practiced in distributed computing environments where tasks are performed by remote processing devices that are linked through a communication network. In a distributed computing environment, program modules may be located in both local and remote computer storage media including memory storage devices.

Figure 10:
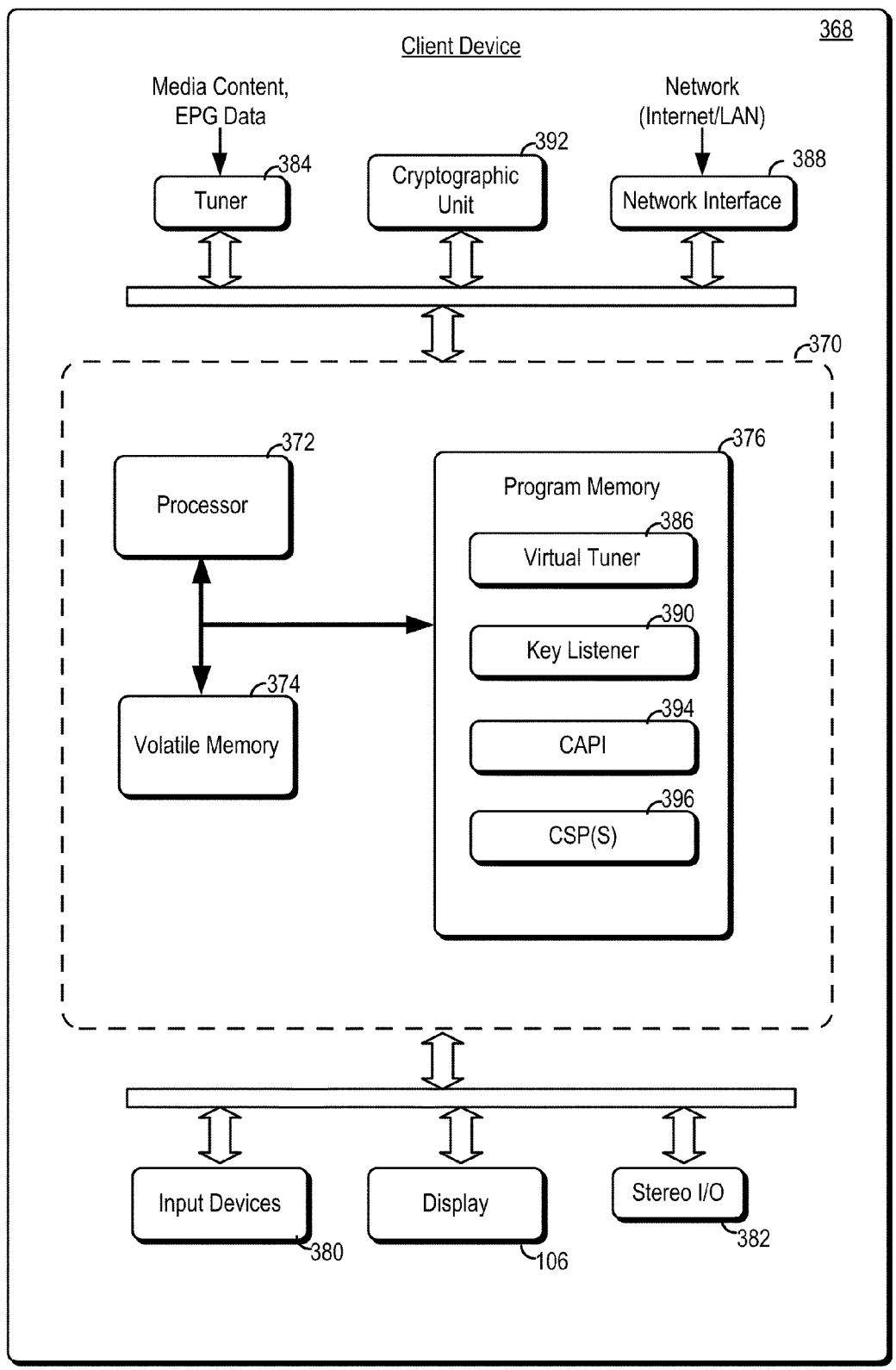
FIG. 10 is a block diagram of a client device according to an embodiment of the present system.

FIG. 10 shows an example configuration of a broadcast-enabled electronic media device 368, which may for example be a set top box associated with television 106. Device 368 includes a central processing unit 370 having a processor 372, volatile memory 374 (e.g., RAM), and program memory 376 (e.g., ROM, Flash, disk drive, floppy disk drive, CD-ROM, etc.). The device 368 has one or more input devices 380 (e.g., remote control, keyboard, mouse, etc.), a video display, which may be television 106 or other VGA, SVGA display, and a stereo I/O 382 for interfacing with a stereo system.

The device 368 has one or more tuners 384 that tune to appropriate addresses on a network, such as the Internet 110, a LAN or WAN, or frequencies not on a network. The tuner can be coupled to an antenna, cable or satellite dish. Alternatively, the tuner may be a "virtual tuner" 386 implemented in software that allows access to a content server such as server 112 (FIG. 1) through a network interface 388. The tuner card 384 may be configured to receive analog and/or digital data. For example, the tuner card 384 can receive MPEG-encoded digital video and audio data, as well as data in many different forms, including software programs and programming information in the form of data files. Network interface 388 provides access to a network and may be a modem, network card, an RF receiver, or other type of port/receiver that provides access to an external network.

The device 368 runs an operating system that supports multiple applications. The operating system may be a multi-tasking operating system that allows simultaneous execution of multiple applications. The operating system may employ a graphical user interface windowing environment that presents the applications or documents in specially delineated areas of the display screen called "windows."

The device is illustrated with a key listener 390 to receive authorization and session keys transmitted from a remote server such as server 112, if necessary. The keys received by listener 390 are used by cryptographic security services implemented to enable decryption of the session keys and data. Cryptographic services are implemented through a combination of hardware and software. A secure, tamper-resistant hardware unit 392 is provided external to the CPU 370. Software layers executing on the processor 372 are used to facilitate access to the resources on the cryptographic hardware 392.

The software layers include a cryptographic application program interface (CAPI) 394 that provides functionality to any application seeking cryptographic services (e.g., encryption, decryption, signing, or verification). One or more cryptographic service providers (CSPs) 396 implement the functionality presented by the CAPI to the application. The CAPI layer 394 selects the appropriate CSP for performing the requested cryptographic function. The CSPs 396 perform various cryptographic functions such as encryption key management, encryption/decryption services, hashing routines, digital signing, and authentication tasks in conjunction with the cryptographic unit 392. A different CSP might be configured to handle specific functions, such as encryption, decryption, signing, etc., although a single CSP can be implemented to handle them all. The CSPs 396 can be implemented as dynamic linked libraries (DLLs) that are loaded on demand by the CAPI, and which can then be called by an application through the CAPI 394.

FIG. 11 shows a computing environment which may for example be media service server 102. A computing environment for implementing aspects of the present system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 11 illustrates operating system 434, application programs 435, other program modules 436, and program data 437.

The computer 410 may also include other removable/non-removable, volatile/nonvolatile computer storage media. By way of example only, FIG. 11 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 11 provide storage of computer readable instructions, data structures, program modules and other data for the computer 410. In FIG. 11, for example, hard disk drive 441 is illustrated as storing operating system 444, application programs 445, other program modules 446, and program data 447. These components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 493, discussed above, or other type of display device is also connected to the system bus 421 via an interface, such as a video interface 490. In addition to the monitor 120, computer 410 may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 11. The logical connections depicted in FIG. 11 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470 (such as interface 126). When used in a WAN networking environment, the computer 410 typically includes a modem 472 or other means for establishing communication over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 11 illustrates remote application programs 485 as residing on memory device 481. It will be appreciated that the network connections shown are exemplary and other means of establishing a communications link between the computers may be used.

The foregoing detailed description of the present system has been presented for purposes of illustration and description. It is not intended to be exhaustive or to limit the present system to the precise form disclosed. Many modifications and variations are possible in light of the above teaching. The described embodiments were chosen in order to best explain the principles of the present system and its practical application to thereby enable others skilled in the art to best utilize the present system in various embodiments and with various modifications as are suited to the particular use contemplated. It is intended that the scope of the invention be defined by the claims appended hereto.

We claim:

1. A method of enabling a client device networked to a media server remote from the client device to play media files, the method comprising:
    (a) detecting the media files formats supported by the client device;
    (b) receiving a list of downloadable media files from the media server;
    (c) formatting the list of downloadable media files from the media server into data structures including links to the media files, said step (c) including the steps of:
        (i) determining whether a media file from the list of downloadable media files is in a format supported by the client device,
        (ii) formatting the data structure for a media file determined in said step (c)(i) to be in a supported format to include a link with an address directly to a source where the media file is located, and
        (iii) formatting the data structure for a media file determined in said step (c)(i) to be in an unsupported format to include a link with an address to the media server;
    (d) generating a user interface for display on a monitor associated with the client device, the user interface displaying the list of downloadable media files;
    (e) receiving a request from the client device to obtain a media file in an unsupported format in accordance with the data structure associated with the media file;
    (f) obtaining the media file requested in said step (e);
    (g) transcoding, by the media server, the media file obtained in said step (f) into a format supported by the client device;
    (h) forwarding the media file transcoded in said step (g) to the client device for playing by the client device;
    (i) receiving a root search query, the root query search generated by the user;
    (j) generating search results for the root search query;
    (k) generating one or more derivative search queries from the root search query, the derivative search queries generated by a metadata mining engine that is capable of deriving search queries that are related to the original root search query;
    (l) generating search results for the one or more derivative search queries; and
    (m) repeating steps (e) through (h) to create a virtual television channel that includes: (i) media files, at least some of which having been transcoded from the unsupported format and (ii) media files from the search results of the root search query in said step (j) and from the search results of the one or more derivative search queries in said step (l).

2. The method of claim 1, further comprising the steps, prior to said step (b), of:
    (n) receiving a request from the client device to perform a search of media files in the media server,
    (o) contacting the media server,
    (p) obtaining categories of available media files from the media server,
    (q) formatting the categories into data structures including links to the categories of available media files at the media server, and
    (r) sending the formatted data structures to the client device.

3. The method of claim 2, further comprising the step, prior to said step (b), of receiving a request from the client device to view one or more of the categories of available media files and contacting the media server to obtain the requested one or more categories.

4. The method of claim 1, further comprising the step of directing the client device to contact the source directly to obtain a media file in a format supported by the client device via the data structure having a link specifying a direct connection to the source of the requested media file.

5. The method of claim 1, wherein said step (h) of forwarding the media file transcoded in said step (g) to the client device comprises the step of forwarding the media file transcoded in said step (g) to one of a set top box associated with a television system, a mobile phone and a gaming console.

6. The method of claim 1, further comprising the step of dividing the media files on the virtual channel into programs of predefined length.

7. The method of claim 1, further comprising the step of playing the media files on the virtual television channel according to a schedule setting the time for content playback some predetermined period of time into the future.

* * * * *